(12) United States Patent
Garza Montemayor et al.

(10) Patent No.: US 10,458,147 B2
(45) Date of Patent: Oct. 29, 2019

(54) SNAP LOCKING COUPLING SYSTEM FOR PIECES OR COUPLING MEMBERS

(71) Applicants: Jose Guadalupe Garza Montemayor, Nuevo Leon (MX); Jorge Eugenio Garza Montemayor, Nuevo Leon (MX)

(72) Inventors: Jose Guadalupe Garza Montemayor, Nuevo Leon (MX); Jorge Eugenio Garza Montemayor, Nuevo Leon (MX)

( * ) Notice: Subject to any disclaimer, the term of this patent is extended or adjusted under 35 U.S.C. 154(b) by 705 days.

(21) Appl. No.: 15/142,314

(22) Filed: Apr. 29, 2016

(65) Prior Publication Data

US 2016/0244991 A1    Aug. 25, 2016

Related U.S. Application Data

(62) Division of application No. 12/906,067, filed on Oct. 15, 2010, now Pat. No. 9,353,546.

(51) Int. Cl.

| E04H 17/14 | (2006.01) |
|---|---|
| F16B 9/00 | (2006.01) |
| F16B 7/04 | (2006.01) |
| F16B 21/08 | (2006.01) |
| B21D 39/03 | (2006.01) |

(52) U.S. Cl.
CPC ....... E04H 17/143 (2013.01); E04H 17/1439 (2013.01); F16B 7/0446 (2013.01); B21D 39/038 (2013.01); E04H 2017/1469 (2013.01); F16B 21/088 (2013.01); Y10T 24/45241 (2015.01)

(58) Field of Classification Search
CPC ............. E04H 17/143; E04H 17/1439; E04H 2017/1478; Y10T 403/7001; Y10T 403/7003
See application file for complete search history.

(56) References Cited

U.S. PATENT DOCUMENTS

| 562,067 A | 6/1896 | Copeland |
|---|---|---|
| 603,224 A | 4/1898 | Avery |
| 2,846,241 A | 8/1958 | McDonnell et al. |
| 2,869,694 A * | 1/1959 | Breckheimer ......... B01D 46/10 52/658 |
| 3,009,719 A | 11/1961 | Otto et al. |
| 3,746,379 A | 7/1973 | Sauer |

(Continued)

FOREIGN PATENT DOCUMENTS

| EP | 1 357 242 | * 10/2003 | ............. E04H 17/14 |
|---|---|---|---|
| GB | 2 174 783 | 11/1986 | |

*Primary Examiner* — Michael P Ferguson
(74) *Attorney, Agent, or Firm* — Young & Thompson

(57) ABSTRACT

A snap coupling system for pieces or metallic or non metallic coupling members, that require to be attached perpendicularly in a "T" fashion, in a cross "+" fashion or angularly, by which a tubular male coupling member having one or more retention tabs that are temporally flexed, enters in slots or receiving apertures of another piece or female coupling member, tubular or planar, where they engage, by which they can be readily attached two tubular members or one tubular member and one planar member, in a perpendicular way, in a cross fashion or angularly, without the necessity of using skilled labor.

4 Claims, 33 Drawing Sheets

(56) References Cited

U.S. PATENT DOCUMENTS

| | | | | |
|---|---|---|---|---|
| 3,748,814 A | * | 7/1973 | Cribben | E06B 3/685 403/207 |
| 3,927,950 A | * | 12/1975 | Herrmann | F16B 7/00 29/525 |
| 4,034,534 A | * | 7/1977 | Taylor | E04B 9/345 403/347 |
| 4,145,858 A | * | 3/1979 | Dovman | E06B 3/6604 52/204.59 |
| 4,161,274 A | * | 7/1979 | Bishop | A47G 29/1201 232/24 |
| 4,479,737 A | | 10/1984 | Bergh et al. | |
| 5,018,332 A | * | 5/1991 | Ying-Kit | E04B 9/345 52/666 |
| 5,190,207 A | | 3/1993 | Peck et al. | |
| 5,249,818 A | | 10/1993 | Patterson | |

\* cited by examiner

SNAP LOCKING COUPLING SYSTEM FOR PIECES OR COUPLING MEMBERS

BACKGROUND OF THE INVENTION

A. Field of the Invention

This invention refers to a snap coupling system which allows instant coupling and safely linking of several coupling members to each other, wherein one or more retention tabs of one male tubular coupling member is temporally flexed to enter into guides or receiving cavities of another female tubular coupling member in which the tabs snaps are engaged; and more particularly is related to a special snap coupling system for joining at least one tubular member to another tubular or flat member in different coupling angles.

B. Background of the Invention

Snap joins are well known, these are commonly used to instantly coupling and securing a variety of tubular coupling members to each other, particularly of plastic materials because the plastic material is particularly suitable because of its flexibility which allows that coupling protrusions of the snap joints could be temporarily flexed to be introduced into a coupling receptacle of another tubular member.

The advantage of the snap joint couplings, is that allow to couple two tubular coupling members without the necessity to use adhesives, bolts, screws, nor special tools to thermally join said tubular coupling members, for which it is necessary to use qualified manpower.

For metallic or non-metallic coupling members, the thermal join by means of welding or fusion is the common way of permanently joining said metallic or non-metallic coupling members. Other joining methods of metallic or non-metallic coupling members involve the use of adhesives or the use of a third holding member to carry out the joining or holding of the elements to each other.

The joining by means of welding, requires special tools as well as qualified manpower and safety equipment. Additionally, the application of welding requires counting with a power source of fuel, as well as measuring and calibration instruments for the materials in order to achieve a squaring of the join (use of levels and squares).

In view of the former, applicants developed a snap coupling system special for metallic or non metallic coupling members requiring joining in diverse coupling angles, by which a tubular male coupling member having one o more retention tabs which are temporarily flexed to enter into guides or receiving cavities of another female coupling member either tubular or flat, in which the tabs snaps, by which two coupling members can be rapidly joined, without the necessity of qualified manpower.

By means of the snap coupling system, of the present invention, two metallic or non metallic coupling members can be permanently or semi permanently joined in diverse coupling angles, without the necessity of use welding, adhesives, additional holding elements, instruments or tools, with which time is saving by avoiding the use of welding. Besides, as the snap coupling uses guides to carry out said coupling, the necessity to measure and size the coupling members is avoided in order to achieve a precise joining, with which one can obtain additional time saving in the joining of the metallic or non-metallic coupling members.

Furthermore, as by means of the snap coupling system of the present invention, the coupling members can be easily assembled in the place wherein these will be used, it is not necessary to transport to the assembling place the assembled or welded pieces in structures which can be too large and difficult to transport.

The snap coupling system of the present invention, promotes the design of individual pieces or coupling members to be assembled, which can be efficiently packed and translated.

SUMMARY OF THE INVENTION

It is therefore a main object of the present invention, to provide a snap coupling system between coupling members, special to join metallic or non-metallic coupling members, in diverse coupling angles, by which a tubular male coupling member having one or more retention tabs which are temporarily flexed to enter into slots or receiving cavities of another female coupling member either tubular or flat, in which the tabs snaps, by which two coupling members can be rapidly joined, without the necessity of qualified manpower.

It is another main object of the present invention, to provide a snap coupling system between coupling members, of the above disclosed nature, by which two metallic or non-metallic coupling members can be permanently coupled in diverse coupling angles, without the necessity to use welding, additional holding elements or tools, by which time is saved because its welding is not necessary.

It is still another main object of the present invention, to provide a snap coupling system between coupling members, of the above disclosed nature, in which the snap coupling provides guides in the coupling members, to carry out the coupling, with which the need of measuring and sizing the coupling members to get a precise coupling is avoided, obtaining additional saving of time in the coupling of the two coupling members.

It is an additional object of the present invention, to provide a snap coupling system between coupling members, of the above disclosed nature, by which coupling members can be easily coupled in the place in which the they are going to be used, without the necessity to transport the coupling members already welded to the assembling place, in structures which can be too long and difficult to be transported.

It is another additional object of the present invention, to provide a snap coupling system between coupling members, of the above disclosed nature, which promotes the design of individual coupling members which can be efficiently packed and translate.

These and other objects and advantages of the snap coupling system between coupling members, of the present invention, will be clear enough to those persons having ordinary skill in the art, from the following detailed description of the embodiments of the invention, which will be disclosed with reference to the accompanied drawings and which will be within the true scope of the present invention.

DETAILED DESCRIPTION OF THE INVENTION

Figure 1:
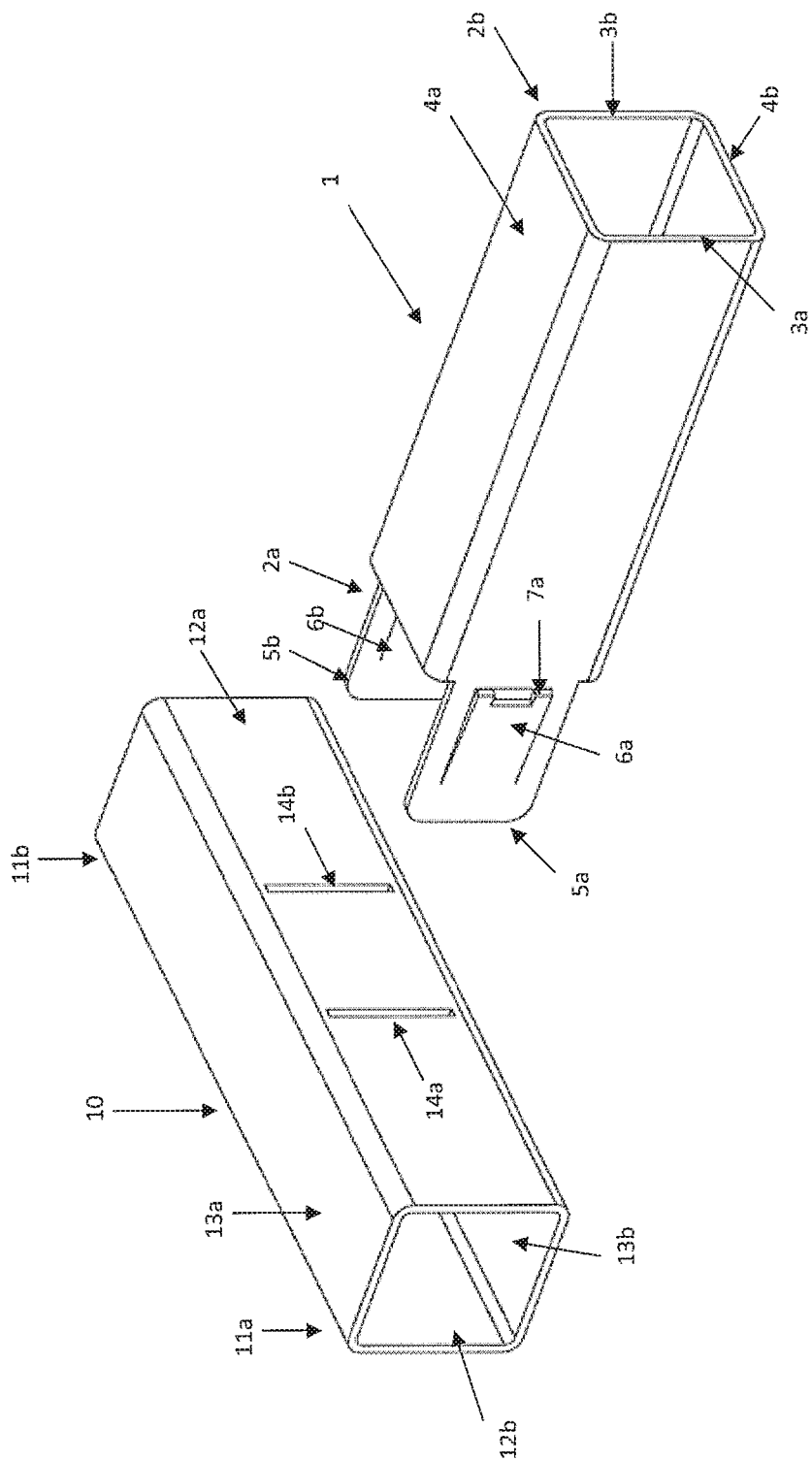
FIG. 1, is a conventional schematic perspective view of the snap coupling system between coupling members, of the present invention, showing a tubular male coupling member, of a quadrangular cross section, showing retention tabs lifted in an angle directed outwardly and a tubular female coupling member, of a quadrangular cross section sowing retention slots, to be assembled with the male coupling member, in a "T" fashion, which constitutes a first preferred embodiment of the system of the present invention.

The snap coupling system, of the present invention, will be described with reference to the accompanying drawings, using reference numbers to identify the constitutive parts of the system, shown in the drawings which illustrate the preferred embodiments of the invention.

In said specific embodiments, the snap coupling system, of the present invention, which is useful for the assembling of elements of structural use such as those used in the manufacture of: railings, fences, bars and protective fences, gates, surrounding fences, protective screens, carpots, trailers, greenhouses, racks, disassembled structures, pergolas, and canopies, automotive, with line furniture, chassis, metallic furniture, among others.

Figure 1A:
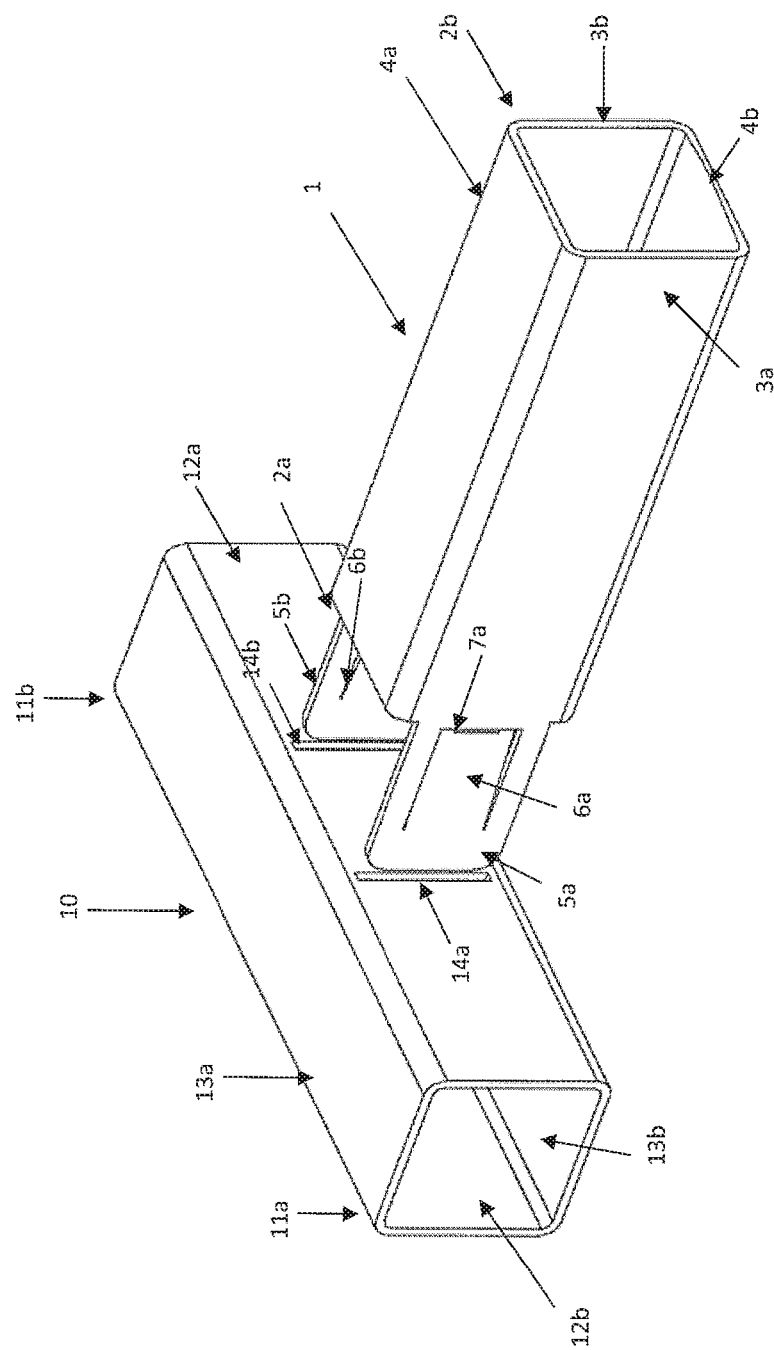
FIG. 1A, is a schematic conventional perspective view of the snap coupling system between coupling members, of the present invention, similar to that of FIG. 1, showing retention tabs introduced in an angle directed.
Figure 1B:
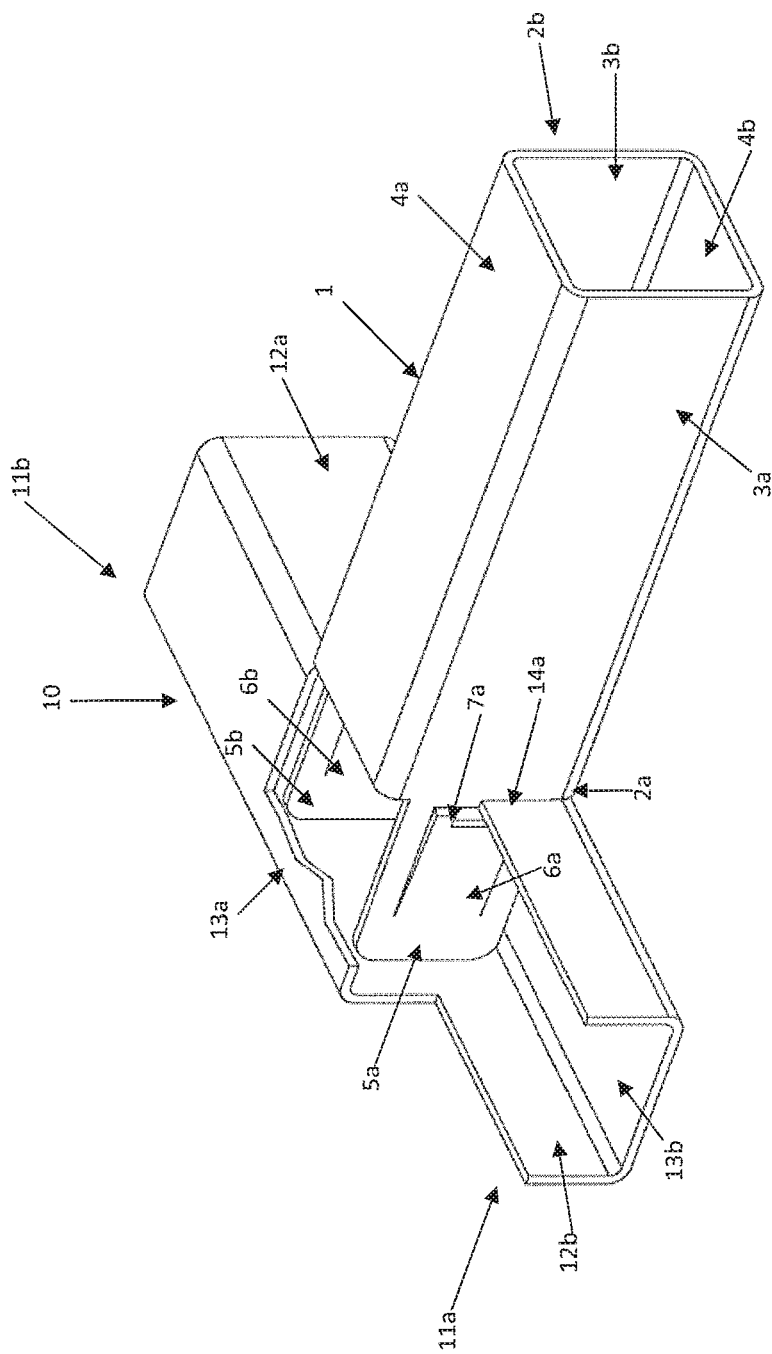
FIG. 1B, is a schematic conventional perspective view of the snap coupling system between coupling members, of FIG. 1, of the present invention, assembled, showing its coupling members partially cut.
Figure 1C:
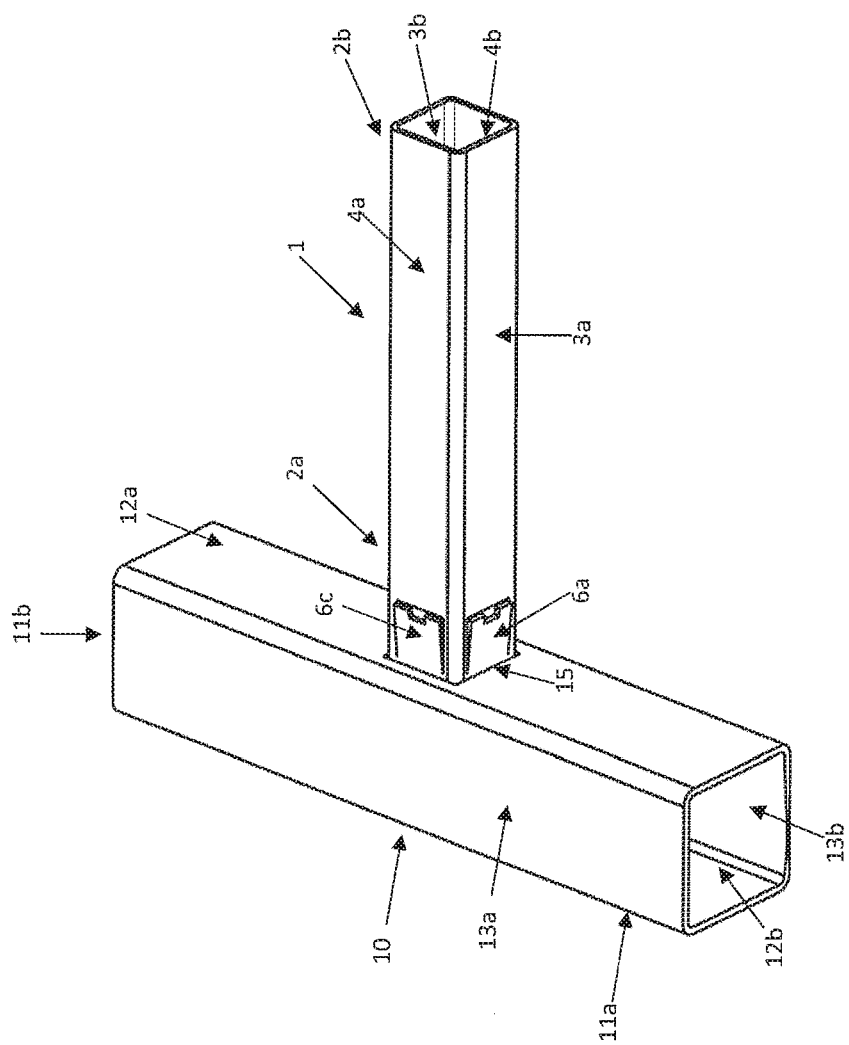
FIG. 1C, is a schematic conventional perspective view of the snap coupling system, between coupling members, of the present invention, showing the tubular male coupling member, of a quadrangular cross section, showing a retention tab lifted in an angle directed outwardly, in each of the walls of a coupling end, and a tubular female coupling member, of a quadrangular cross section, showing a retention quadrangular aperture in one coupling wall of the female coupling member, paced in an intermediate portion thereof, to be assembled with the male coupling member, in a "T" fashion, constituting another preferred embodiment of the system of FIG. 1, in accordance with the present invention.
Figure 1D:
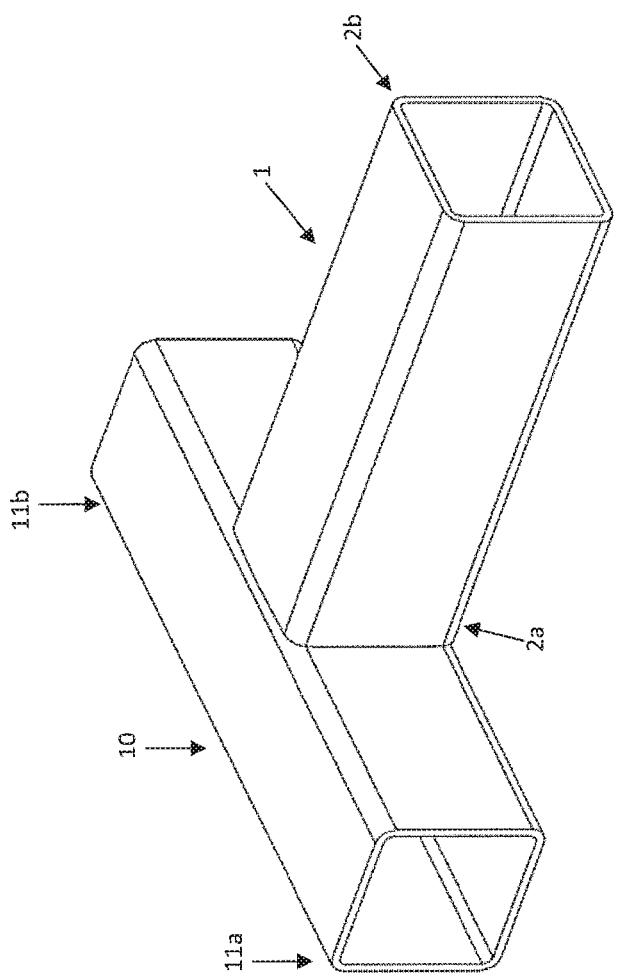
FIG. 1D, is a schematic conventional perspective view of the snap coupling system, between coupling members, of FIG. 1, of the present invention, fully assembled.

Referring to a first embodiment of the snap coupling system, between tubular coupling members of a quadrangular cross section, for its assembling in a "T" fashion, of the present invention, illustrated in FIG. 1, this comprises:

a tubular male coupling member 1, of a quadrangular cross section, of: a first end 2a and a second end 2b; a first lateral wall 3a and a second lateral wall 3b; an upper wall 4a and a lower wall 4b; a first projection 5a extending from the first end 2a of the first side wall 3a of the a tubular male coupling member 1, said projection 5a including a retention tab 6a, cut therein, directed to the second end 2b of said a tubular male coupling member 1 and lifted in an angle outwardly of said a tubular male coupling member 1, having a retention edge 7a; and a second projection 5b extending from the first end 2a of the second side wall 3b of the a tubular male coupling member 1, said projection 5b including a retention tab 6b cut therein, directed also to the second end 2b of the a tubular male coupling member 1 and lifted in a angle directed outwardly of said a tubular male coupling member 1, having a retention edge 7b (not illustrated);

a tubular female coupling member 10 to be perpendicularly coupled to the a tubular male coupling member 1, in a "T" fashion, of a quadrangular cross section, and having: a first end 11a and a second end 11b; a first side wall 12a and a second side wall 12b, and an upper wall 13a and a lower wall 13b, each of which having an inner wall and an outer wall; a first and a second parallel transversal slots 14a, 14b, each of which extending vertically widthwise to the first side wall 12a of the a tubular female coupling member 10, as it is illustrated in FIG. 1, wherein the distance between the first and second slots 14a and 14b is similar to the distance existing between the first and second projections 5a and 5b of the tubular male coupling member 1, as it is illustrated in FIGS. 1, 1B and 1D; and wherein the first and second projections 5a and 5b, with its respective retention tabs 6a and 6b, of the side walls 3a and 3b of the a tubular male coupling member 1, passing in a guided way, momentarily flexing said tabs, trough the parallel first and second transversal slots 14a and 14b of the first side wall 12a of the a tubular female coupling member 10, en a perpendicular way, such that, when the tabs recover its position, its retention edge 7a, 7b (not illustrated) are locked at the inner surface of the first side wall 12a of the a tubular female coupling member 10, being retained both coupling members to each other.

In the embodiment illustrated in FIG. 1A, the retention tabs 6a and 6b (not illustrated) are flexed inwardly of the inner surface of the side walls 3a and 3b of the tubular male coupling member 1, conversely to the embodiment illustrated in FIG. 1.

In the embodiment of FIG. 1C, the a tubular male coupling member, of a quadrangular cross section, comprising two retention tabs 6a, 6b (not illustrated) lifted in an angle directed outwardly, each of which placed in each of the respective side walls 3a and 3b of the first end 2a of the a tubular male coupling member 1, and two retention tabs 6c, 6d (not illustrated) lifted also in an angle directed outwardly, placed at the same height of the tabs 6a and 6b (not illustrated), each of which placed in each of the respective upper and lower walls 4a and 4b in the same first end of the a tubular male coupling member 1; and;

the tubular female coupling member 10, of a quadrangular cross section, showing a quadrangular retention aperture 15 in an intermediate portion of the side wall 12a of the a tubular female coupling member 10, to be assembled with the a tubular male coupling member 1, in a "T" fashion, constituting another preferred embodiment of the system of FIG. 1, according with the present invention.

It should be understand that it is possible that some of the walls of the tubular male coupling member, could include only one tab lifted outwardly or inwardly; and the tubular female coupling member could include a single slot, to give a required assembling force.

Or else, it is possible that one of the walls of the a tubular male coupling member, could include a first tab in one of its walls and a second tab in an opposite wall, placed opposite to the first tab, both lifted outwardly; and the tubular female coupling member could have a quadrangular aperture, to provide stronger assembling force.

In all the preferred embodiments, the parallel transversal slots 14a and 14b (FIG. 1) or the quadrangular aperture 15 (FIG. 1C) are made with means which allow high precision cuts such as a cutter by water jet cutting, oxygen cut, plasma cutting and laser cutting and precision die cut, to mention some of them, in order to obtain precision cuts allowing the insertion of the first and second projections 5a and 5b with very close tolerances which provides an optimum adjustment to the joining.

Also, it should be understand that the projections and/or the tabs of the tubular male coupling member should be dimensioned such that they could enter into the slots or quadrangular apertures of the tubular female coupling member.

The retention tabs 6a and 6b of the first and second projections 5a and 5b (FIG. 1) are formed in said projections by means of a semi quadrangular cut which defines the form of each tab, and afterwards each tab 6a and 6b already formed, is flexed and lifted in an angle directed inwardly or outwardly regarding the plane of the corresponding projections 5a and 5b, such that the retention edge 7a and 7b remain protruded outwardly or inwardly of the a tubular male coupling member 1, so that they locked leaning on the inner edge of the slots 14a and 14b of the tubular female coupling member 10.

Additionally, each tab 6a and 6b can include a notch in a central portion of the end thereof in order to introduce a tool there through and facilitate flexing of the tab to a desired position.

When both tubular male 1 and female 10 coupling members are to be joined, the first and second projections 6a and 6b of the a tubular male coupling member 1 are perpendicularly inserted into the first and second parallel slots 14a, 14b of the a tubular female coupling member 10, such that the retention tab 6a, 6b of each projection 5a, 5b are flexed staying in the same plane as the corresponding projection 5a, 5b, until it completely enters perpendicularly into the parallel slots 14a, 14b of the a tubular female coupling member 10, and turns back by deflection to its lifted or sunken position, such that the retention edge 7a, 7b of each tab 6a and 6b, form a padlock being locked on the inner surface of the inner surface of the first side wall 12a of the a tubular female coupling member 10, as it is shown in FIGS. 1, 1A, 1B, 1C and 1D, avoiding that the projection 6a, 6b could slide outside of the slot 14a, 14b of the a tubular female coupling member 10.

Additionally that the projections 6a, 6b of the a tubular male coupling member 1 cannot be withdrawn from the a tubular female coupling member 10, they also cannot turn because of the closed tolerance with which they were inserted, because there is no space of "backlash" between the projections 5a and 5b, the parallel transversal slots 14a, 14b and the inner surface of the first side wall 12a of the a tubular female coupling member 10.

In this way, in the preferred embodiments of the invention, illustrated in FIG. 1 and in FIG. 1A, the a tubular male coupling member 1 stay joined by an end 2a to the a tubular female coupling member 10, perpendicularly, forming a "T" as it is shown in FIG. 1B and FIG. 1D.

The joining between the a tubular male coupling member 1 and the a tubular female coupling member 10, can or cannot be disassembled, depending of the position and angle of each tab in the moment of the insertion of the projections. In the preferred embodiments of the invention, the joining is permanent.

Figure 2:
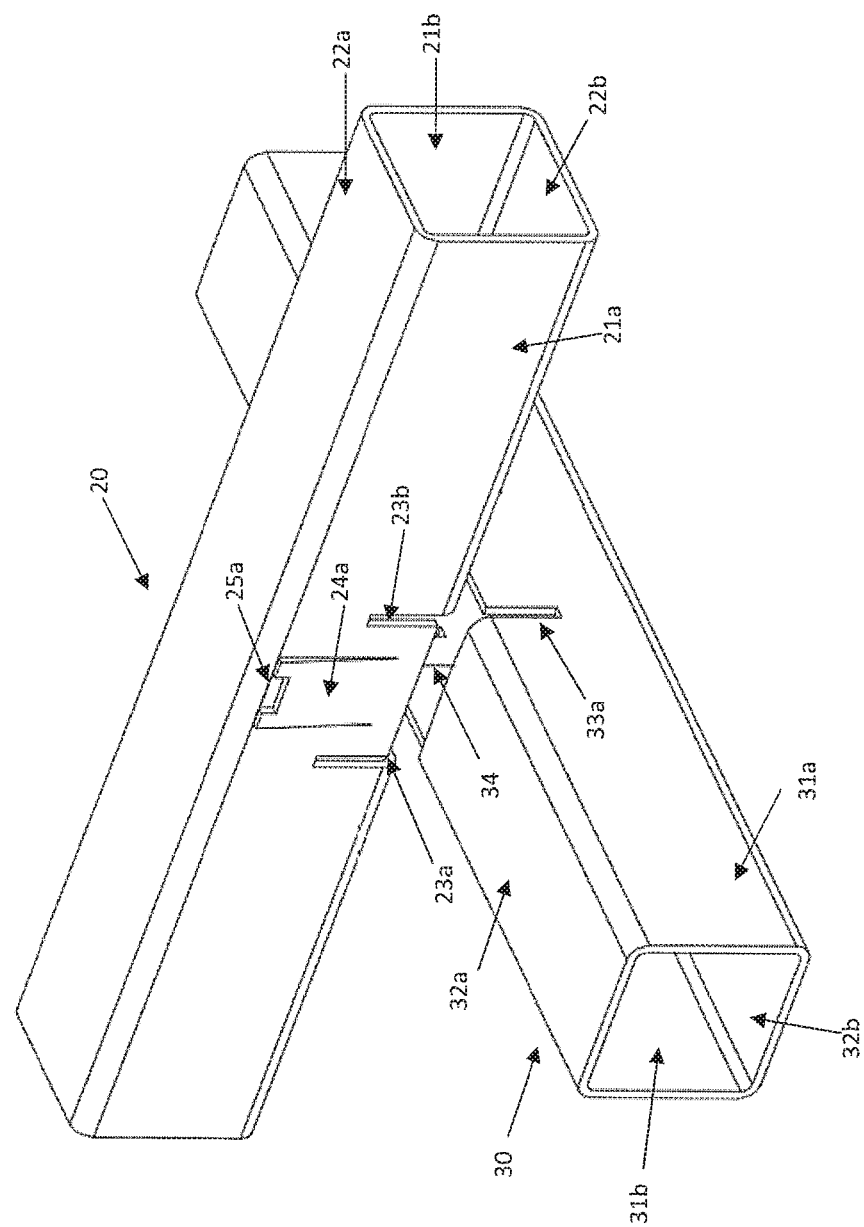
FIG. 2 is a schematic conventional perspective view of the snap coupling system, between coupling members, of the present invention, showing a tubular male coupling member, of a quadrangular cross section showing its retention tabs lifted in an angle directed outwardly and a tubular female coupling, of quadrangular cross section, sowing its retention slots, to be assembled to each other is a "+" fashion, constituting a second preferred embodiment of the system, according to the present invention.
Figure 2A:
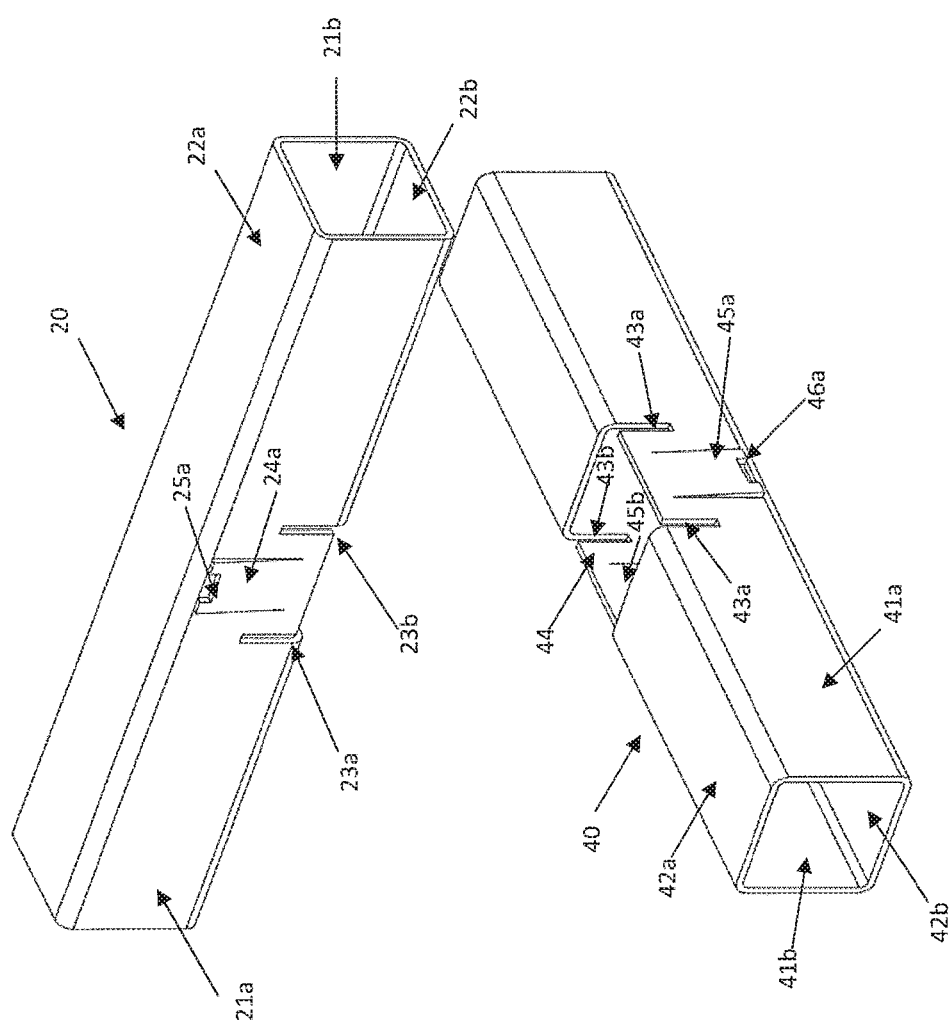
FIG. 2A is a schematic conventional perspective view of the snap coupling system, between coupling members, of the present invention, similar to that of FIG. 2, showing the retention tabs of both the male member and the female member.
Figure 2B:
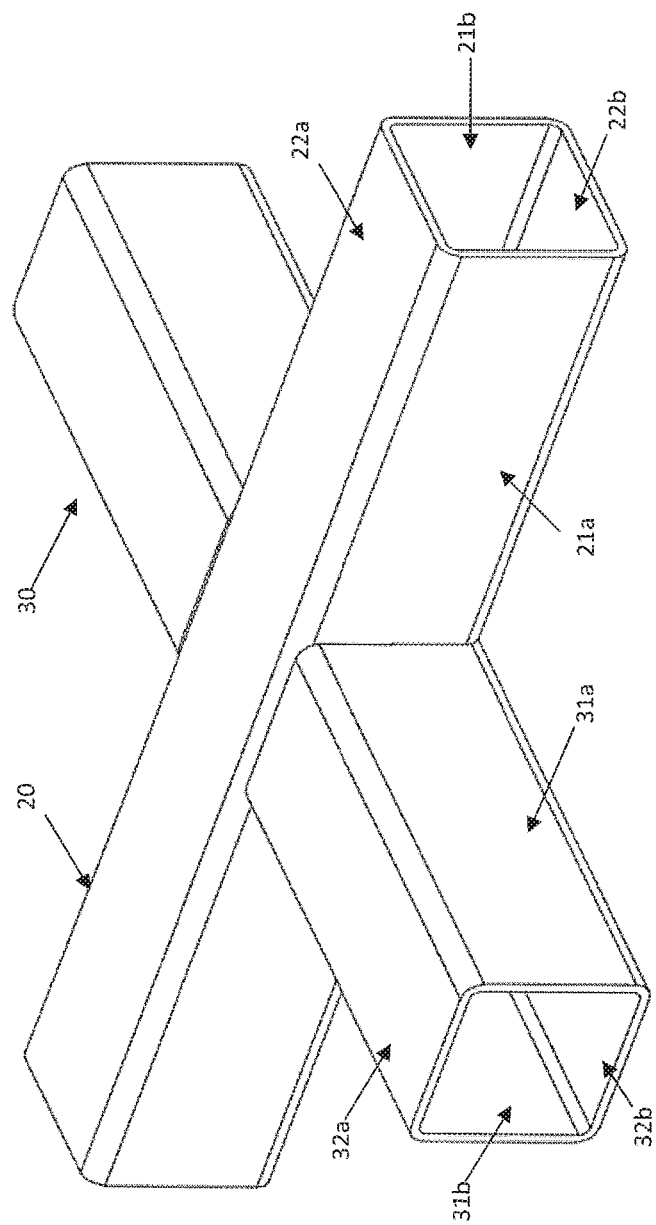
FIG. 2B, is a schematic conventional perspective view of the snap coupling system, between coupling members, of FIG. 2, of the present invention, fully assembled in a "+" fashion.

In a second embodiment of the invention, illustrated in FIG. 2, the snap coupling system, between coupling members of a quadrangular cross section to be assembled in a "+" fashion, of the present invention, this comprises:

a tubular male coupling member 20, of a quadrangular cross section, having: a first side wall 21a and a second side wall 21b; an upper wall 22a and a lower wall 22b; a first and a second slots 23a, 23b, parallel to each other, both made transversally at an intermediate portion of the side walls 21a and 21b, extending from the edge of the lower wall 22b to the upper wall 22a; a first retention tab 24a and a second retention tab 24b (not illustrated), both practiced between the slots 23a and 23b, in each side wall 21a and 21b, beginning from the lower wall 22b to the upper wall 22a, presenting a retention edge 25a and 25b (not illustrated), respectively;

a tubular female coupling member 30, of a quadrangular cross section, to be perpendicularly coupled to the a tubular male coupling member 20 in a "+" fashion, having a first side wall 31a and a second side wall 31b; an upper wall 32a and a lower wall 32b; a first transversal slot 33a and a second transversal slot 33b (not illustrated), parallel to each other, each of which extends vertically from the upper wall 32a to the lower wall 32b; and a quadrangular cut 34 in the upper wall 32a, to allow the insertion of the a tubular male coupling member 20, between the slots 33a and 33b (not illustrated), so that the retention edges 25a and 25b (not illustrated) stay locked against the inner edges of the upper edge of the upper wall 32a at both sides of the quadrangular cut 34, staying in this way coupled the a tubular male coupling member 20, with the a tubular female coupling member 30 in a "+" fashion as it is illustrated in FIGS. 2 and 2B;

The tubular male coupling member 20, further including a quadrangular cut (not illustrated) in its lower wall 22b, in such a way that can be tightly received in the tubular female coupling member 30 to form a joining in a "+" fashion between both tubular coupling members.

To obtain a "+" highly secure, as it is illustrated in FIG. 2A, the tubular female coupling member 40 can include, beside of the slots 43a and 43b and the quadrangular cut 44, a first retention tab 45a and a second retaining tab 45b, both practiced between the slots 43a and 43b, in each lateral wall 41a and 41b, starting from the edge of the lower wall 42b to the upper wall 42a, presenting a retention edge 46a and 46b (not illustrated), respectively, staying in this way firmly coupled the tubular male coupling member 20 with the tubular female coupling member 40 in a "+" fashion.

Figure 3:
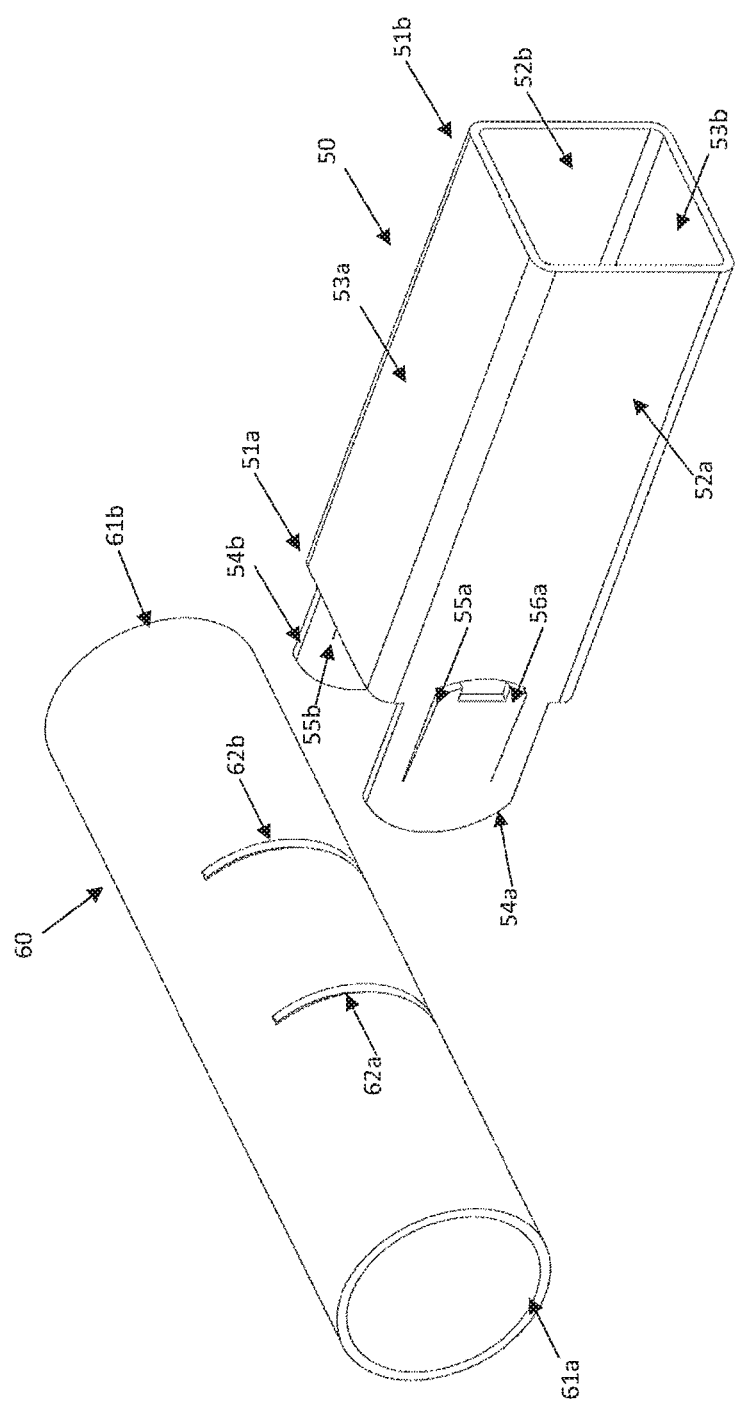
FIG. 3, is a schematic conventional perspective view of the snap coupling system, between coupling members, of the present invention, showing a tubular male coupling member of a quadrangular cross section, showing retention tabs lifted in an angle directed outwardly, and a tubular female coupling member of a circular cross section, showing its retention slots for the coupling in a "T" fashion, constituting a third preferred embodiment of the system, according to the present invention.
Figure 3A:
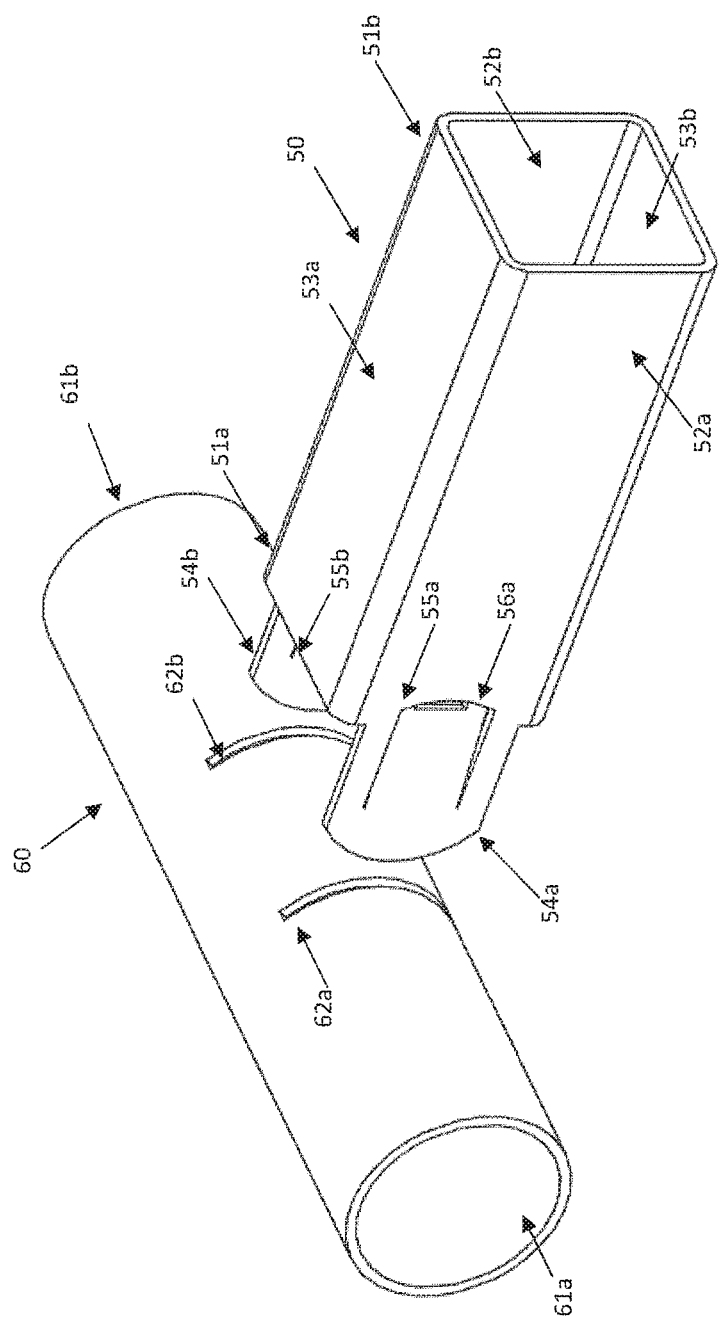
FIG. 3A is a schematic conventional perspective view of the snap coupling system, between coupling members, of the present invention, similar to that of FIG. 3, showing the retention tabs introduced in an angle directed inwardly.
Figure 3B:
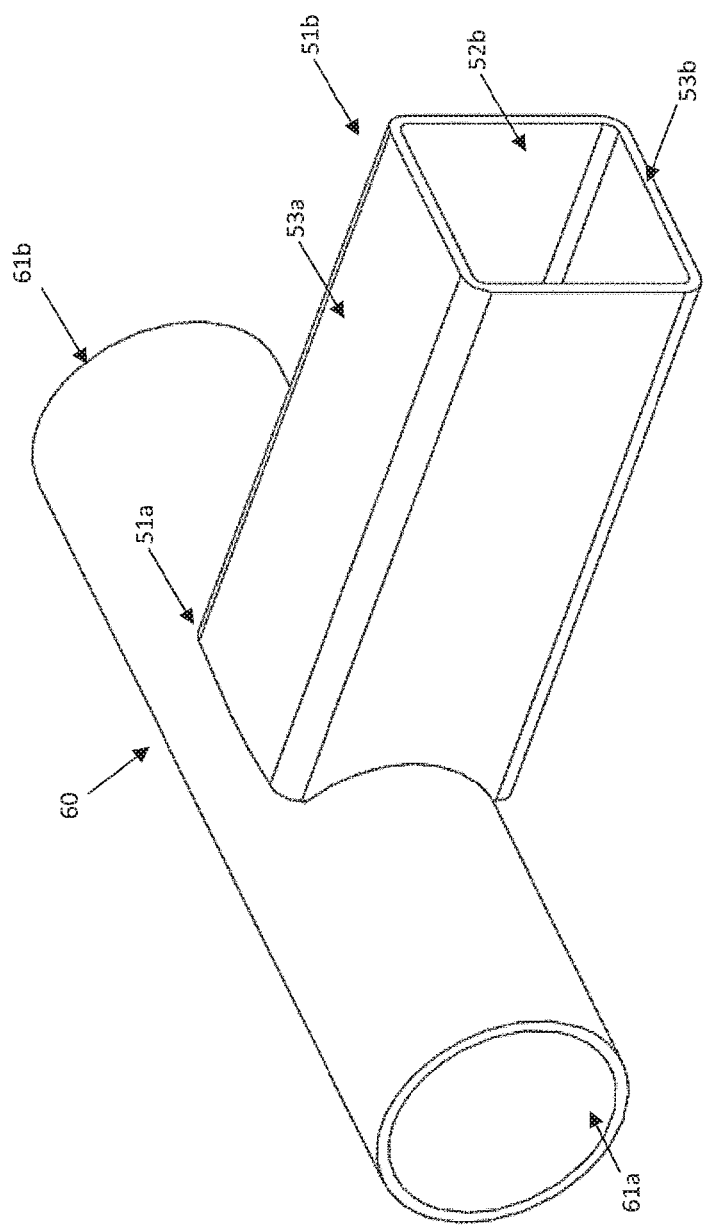
FIG. 3B, is a schematic conventional perspective view of the snap coupling system, between coupling members, of FIG. 3, of the present invention, fully assembled in a "T" fashion.

In a third embodiment of the invention, illustrated in FIG. 3, the snap coupling system, between a tubular male coupling member, of a quadrangular cross section, to be coupled in a "T" fashion with a tubular female coupling member, of a circular cross section, of the present invention, this comprises:

a tubular male coupling member 50, of a quadrangular cross section, having a first end 51a and a second end 51b; a first side wall 52a, and a second side wall 52b; an upper wall 53a and a lower wall 53b; a first projection 54a extending from the first end 51a of the first side wall 52a of the a tubular male coupling member 50, said projection 54a including a retention tab 55a, cut in therein, directed to a second end 51b of said a tubular male coupling member 50 and lifted in an angle outwardly of said a tubular male coupling member 50, presenting a retention edge 56a; and a second projection 54b, extending from the first end 51a of the second side wall 52b of the tubular male coupling member 50, said projection 54b including a retention tab 55b, cut therein, directed also to the second end 51b of said a tubular male coupling member 50 and lifted in an angle outwardly of said a tubular male coupling member 50, presenting a retention edge 56b (not illustrated).

a tubular female coupling member 60 to be perpendicularly coupled to the a tubular male coupling member 50, in a "T" fashion, of a circular cross section, having: an inner surface and an outer surface; a first end 61a and a second end 61b; a first and a second parallel transversal slots 62a, 62b, aligned at the same height to each other, in an intermediate portion of the a tubular female coupling member 60, each of which extends vertically widthwise of the of the wall of the tubular female coupling member 60, such as it is illustrated in FIG. 3, wherein the distance between the first and second slots 62a, 62b is similar to the distance existing between the first and second projections 54a, 54b of the tubular male coupling member 50 as it is illustrated in FIG. 3;

the projections 54a, 54b and its retention edges 56a and 56b, (not illustrated), preferably having its edge curved, with the same curvature as the a tubular female coupling member 60;

wherein the first and second projections 54a and 54b with their respective retention tabs 55a and 55b of the side walls 52a and 52b of the a tubular male coupling member 50, passing in a guided way through the first and second parallel transversal slots 62a, 62b of the surrounding wall of the a tubular female coupling member 60 in a perpendicular way, so that the retention edge 56a, 56b (no illustrated) of each of the first and second retention tabs 56a and 56b of the projections 54a, 54b, be locked at the inner wall of the a tubular female coupling member 60, being retained both coupling members to each other, in a "T" fashion, as can be observed from FIG. 3B.

In the embodiment illustrated in FIG. 3A, the retention tabs 55a and 55b stay flexed inwardly of the inner surface of the side walls 52a and 52b of the tubular male coupling member 50, inversely from the embodiment illustrated in FIG. 3.

Figure 4:
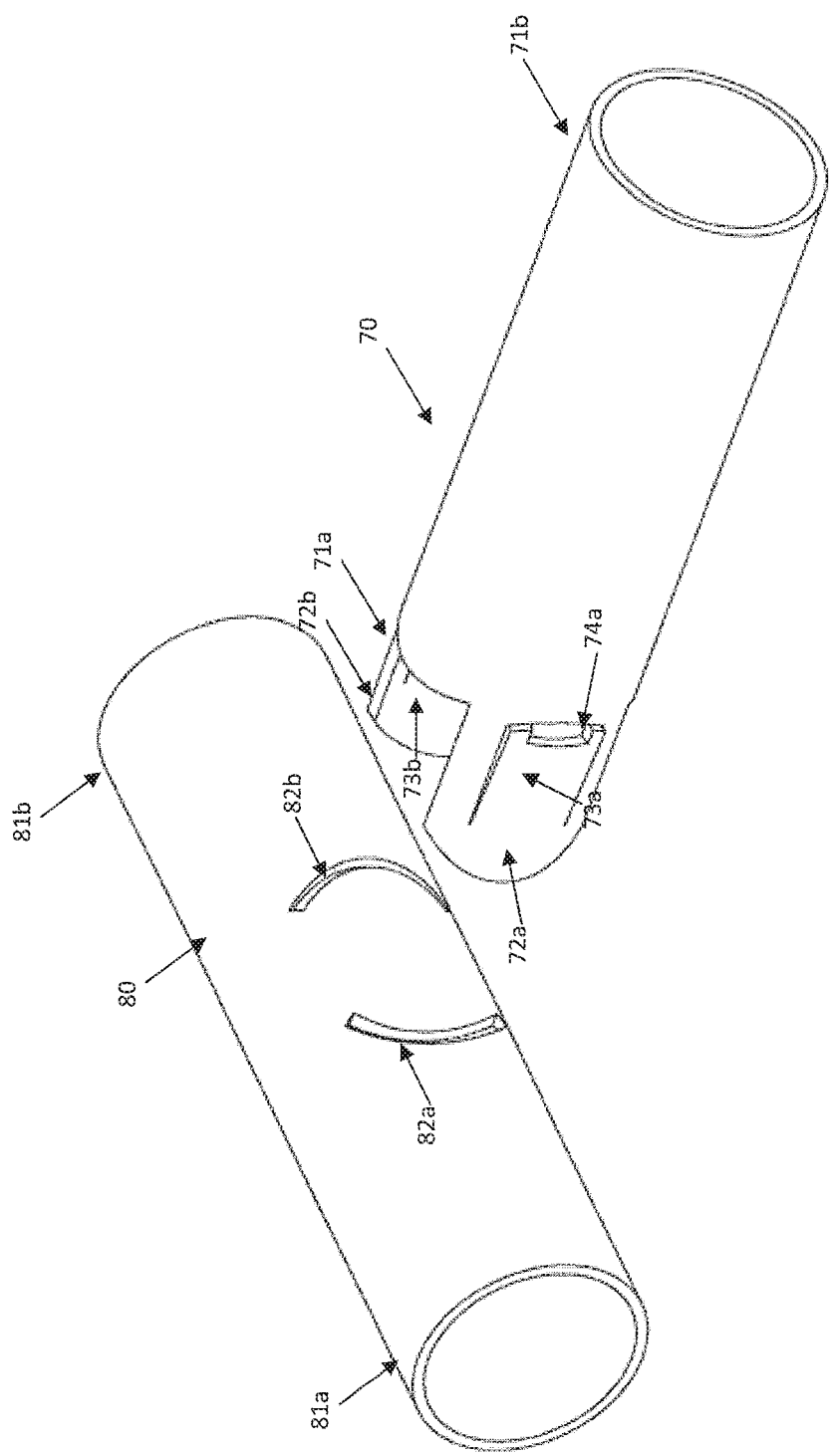
FIG. 4, is a schematic conventional perspective view of the snap coupling system, between coupling members, of the present invention, showing a tubular male coupling member of a circular cross section, showing retention tabs lifted in an angle directed outwardly, and a tubular female coupling member, of a circular cross section, showing its retention slots, for its coupling in a "T" fashion, constituting a fourth preferred embodiment of the system according with the present invention.
Figure 4A:
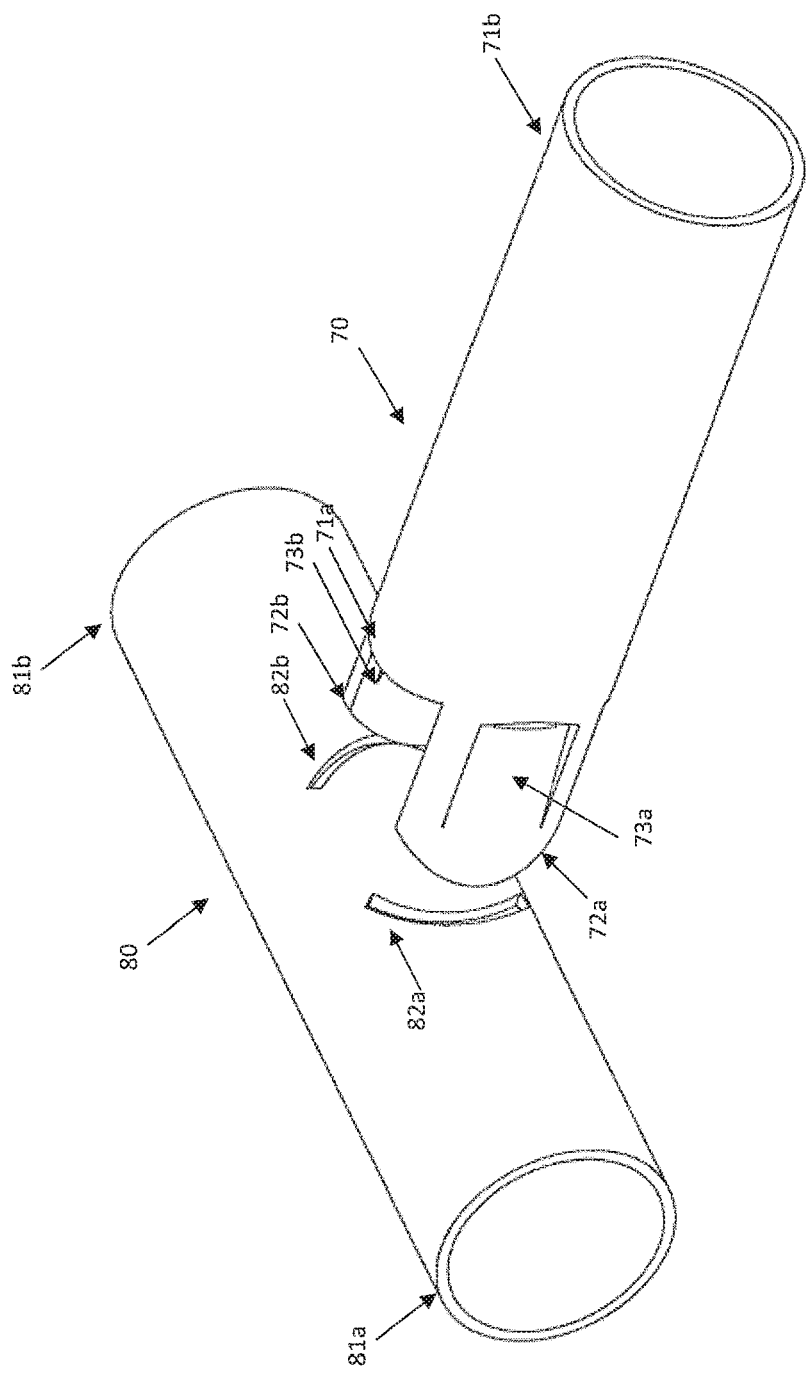
FIG. 4A, is a schematic conventional perspective view of the snap coupling system, between coupling members, of the present invention, similar to that of FIG. 4, showing retention tabs introduced in an angle directed inwardly.
Figure 4B:
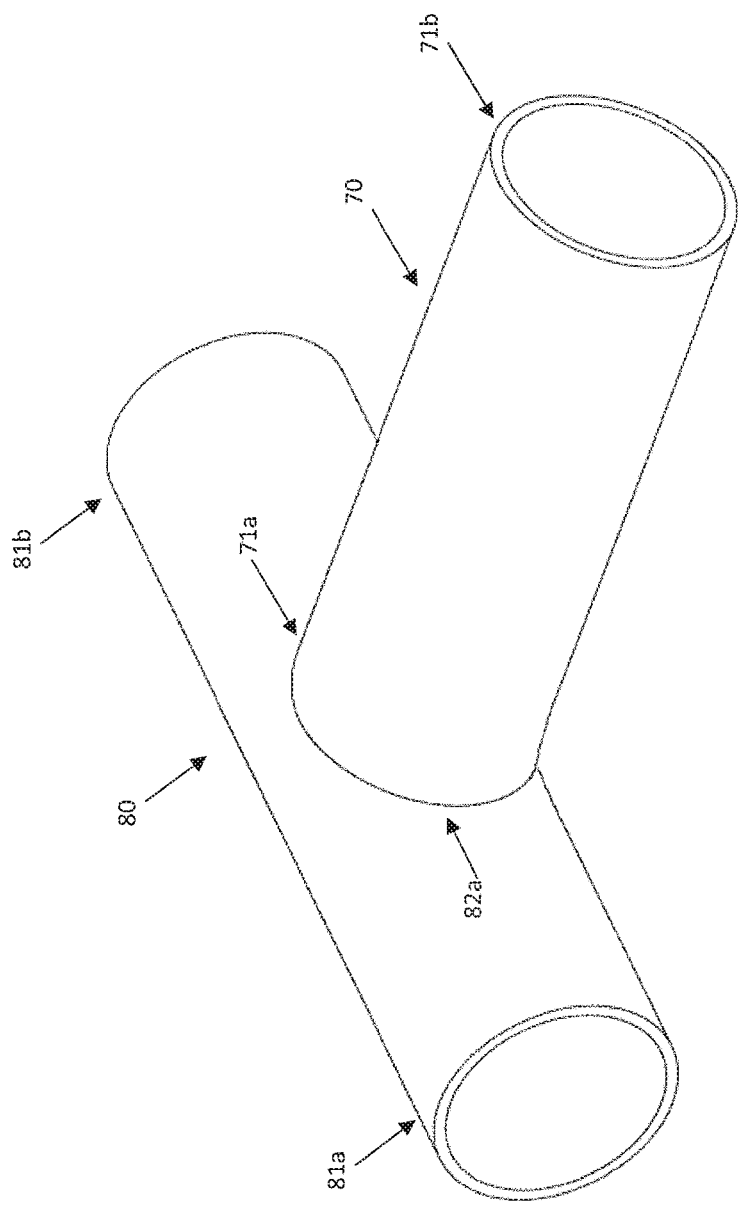
FIG. 4B, is a schematic conventional perspective view of the snap coupling system, between coupling members, of FIG. 4, of the present invention, fully assembled in a "T" fashion.

In a fourth embodiment of the invention, illustrated in FIG. 4, the snap coupling system, between a tubular male coupling member, of a circular cross section, to be assembled in a "T" fashion with a tubular female coupling member, of a circular cross section, of the present invention, this comprises:

a tubular male coupling member 70, of a circular cross section, and having: a first end 71a and a second end 71b; a first projection 72a extending from the first end 71a of the a tubular male coupling member 70, said projection 72a including a retention tab 73a, cut therein, directed from the second end 71b of said tubular male coupling member 70 and lifted in an angle outwardly of the a tubular male coupling member 70, presenting a retention edge 74a; and a second projection 72b extending from the first end 71a of the a tubular male coupling member 70, opposite to the first projection 72a, said second projection 72b including a retention tab 73b, cut therein, directed also to the second end 71b of said tubular male coupling member 70 and lifted in an angle outwardly of the a tubular male coupling member 70, presenting a retention edge 74b (not illustrated);

a tubular female coupling member 80 to be perpendicularly coupled to the a tubular male coupling member 70, in a "T" fashion, of a circular cross section and having: an inner surface and an outer surface; a first end 81a and a second end 81b; a first and a second parallel transversal slots 82a, 82b aligned at the same height to each other, at an intermediate portion of the a tubular female coupling member 80, each of which extends vertically widthwise of the wall of the a tubular female coupling member 80, such as illustrated in FIG. 4, wherein the distance between the first and second slots 82a and 82b is similar to the distance existing between the first and second projections 72a and 72b of the a tubular male coupling member 70, such as is illustrated in FIG. 4;

the projections 72a and 72b and its retention edges 74a and 74b (not illustrated) preferably having its edge curved with the same curvature as the tubular female coupling member 80, wherein the first and second projections 72a and 72b, with their respective retention tabs 73a and 73b of the tubular male coupling member 70, passing in a guided way through the first and second parallel transversal slots 82a, 82b of the tubular female coupling member 80, in a perpendicularly way, such that the retention edge 74a, 74b (not illustrated) of each of the first and second retention tabs 73a and 73b of the projections 72a, 72b, stay locked on the inner surface of the a tubular female coupling member 80, being retained both coupling members to each other in a "T" fashion, such as can be observed from FIG. 4B.

In the embodiment illustrated in FIG. 4A, the retention tabs 73a and 73b are flexed inwardly of the inner surface of the tubular male coupling member 70, inversely to the embodiment illustrated in FIG. 4.

Figure 5:
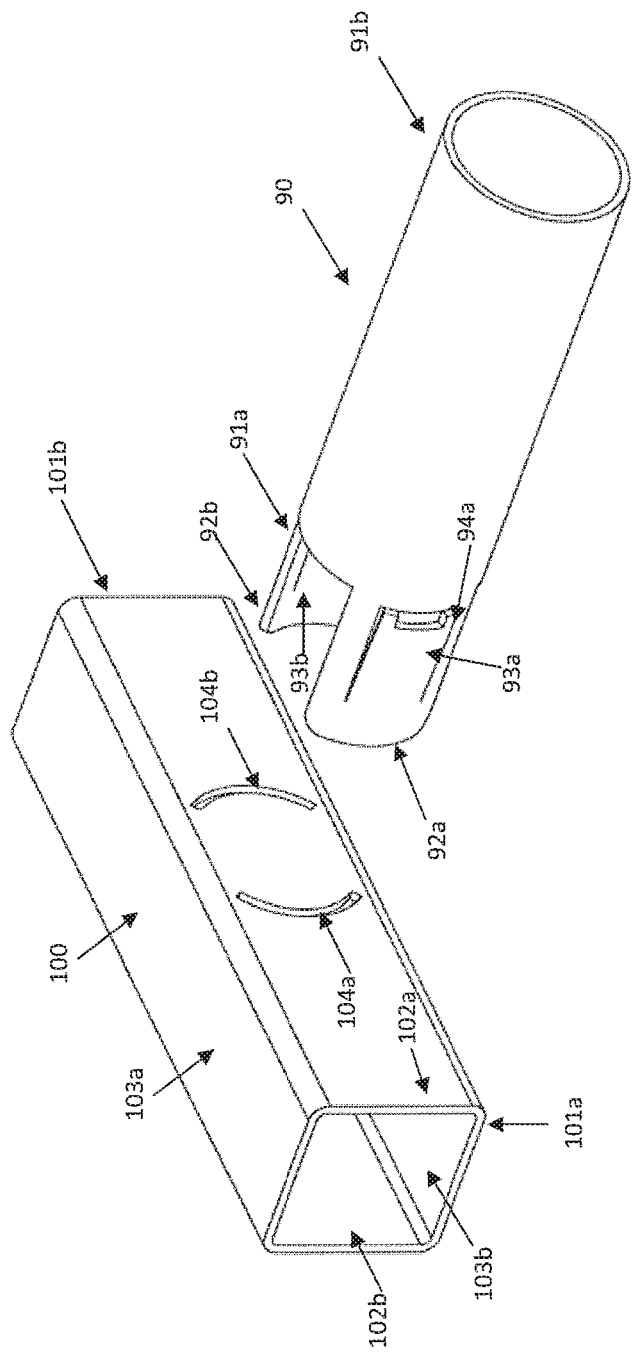
FIG. 5, is a schematic conventional perspective view of the snap coupling system, between coupling members, of the present invention, showing a tubular male coupling member, of a circular cross section, showing retention tabs lifted in an angle directed outwardly, and a tubular female coupling member, of a quadrangular cross section, showing its retention slots curved for its coupling in a "T" fashion, constituting a fifth preferred embodiment of the system according to the present invention.
Figure 5A:
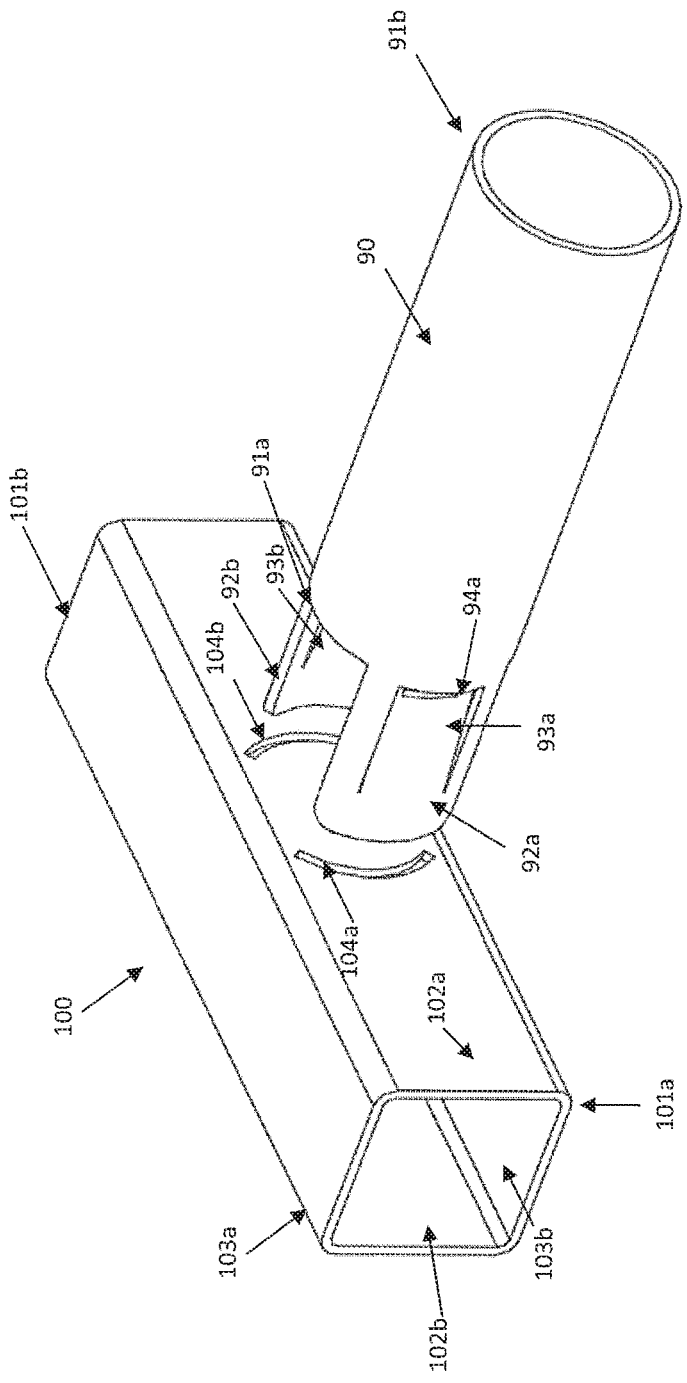
FIG. 5A, is a schematic conventional perspective view of the snap coupling system, between coupling members, of the present invention, similar to that of FIG. 5, showing the retention tabs introduced in an angle directed inwardly.
Figure 5B:
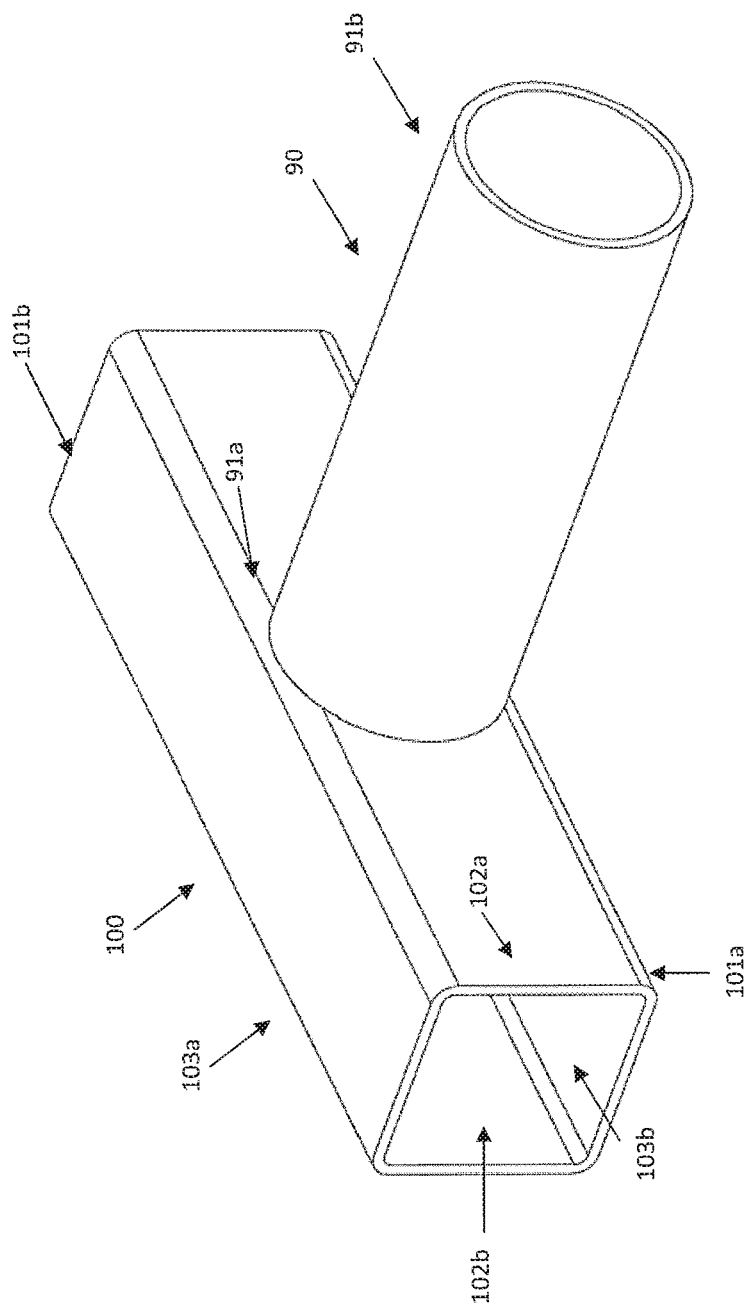
FIG. 5B, is a schematic conventional perspective view of the snap coupling system, between coupling members, of FIG. 5, of the present invention, fully assembled in a "T" fashion"

In a fifth embodiment of the invention, illustrated in FIG. 5, the snap coupling system, between tubular male coupling member, of a circular cross section to be assembled in a "T" fashion, with a tubular female coupling member, of quadrangular cross section, of the present invention, this comprises:

tubular male coupling member 90 of a circular cross section, having: a first end 91a and a second end 91b; a first projection 92a extending from the first end 91a of the tubular male coupling member 90, said projection 92a including a retention tab 93a, cut therein, directed to the second end 91b of said tubular male coupling member 90 and lifted in angle outside of said tubular male coupling member 90, presenting a retention edge 94a; and a second projection 92b opposite to the a first projection 92a in the same end 91a, extending from the first end 91a of the tubular male coupling member 90, to the second end 91b of the tubular male coupling member 90, said second projection 92b including a retention tab 93b cut therein, directed also to the second end 91b of tubular male coupling member 90 and lifted in an angle directed outwardly of said tubular male coupling member 90, presenting a retention edge 94b (not illustrated);

tubular female coupling member 100, to be perpendicularly coupled to the tubular male coupling member 90, in a "T" fashion, of a quadrangular cross section, having an inner surface and an outer surface; a first end 101a and a second end 101*b*; a first lateral wall 102*a* and a second lateral wall 102*b*; and an upper wall 103*a* and a lower wall 103*b*, a first and a second parallel transversal slots 104*a*, 104*b*, having a curvature to the ends 101 and 101*b* respectively, similar to those of the projections 92*a*, 92*b* of the tubular male coupling member 90, aligned at the same height to each other, at an intermediate portion of the tubular female coupling member 100, each of which extending vertically widthwise of the side wall 102*a* of the tubular female coupling member 100, such as it is illustrated in FIG. 5, wherein the distance between the first and second slots 104*a* and 104*b* is similar to the distance existing between the first and second projections 92*a* and 92*b* of the tubular male coupling member 90, such as it is illustrated in FIG. 5;

wherein the first and second projections 92*a*, 92*b* with its respective retention tabs 93*a* and 93*b* of the tubular male coupling member 90 passing in a guided way through the first and second parallel transversal slots 104*a*, 104*b* of the tubular female coupling member 100 in a perpendicular way, in such a way that the retention edge 94*a* and 94*b* (not illustrated) of each of the first and second retention tabs 93*a* and 93*b* of the of the projections 92*a*, 92*b*, are locked on the inner surface of the tubular female coupling member 100, being retained both coupling members to each other, in a "T" fashion, such as it is illustrated in FIG. 5B;

In the embodiment illustrated in FIG. 5A, the retention tabs 93*a*, 93*b* being flexed inwardly at the inner surface of the tubular male coupling member 90, conversely of the embodiment of FIG. 5.

Figure 6:
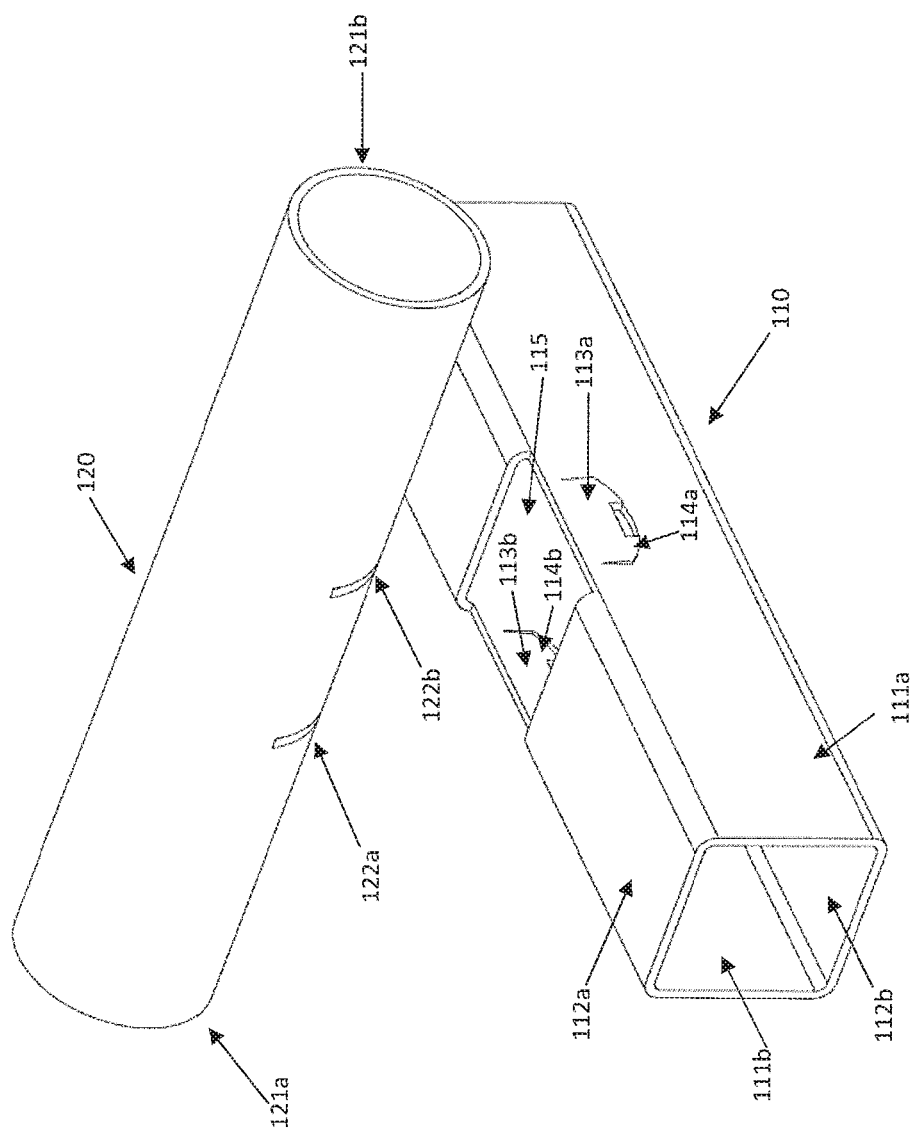
FIG. 6, is a schematic conventional perspective view of the snap coupling system, between coupling members, of the present invention, showing a tubular male coupling member, of a quadrangular cross section, showing retention tabs lifted in an angle directed outwardly and a quadrangular retention cut, and a tubular female coupling member, of a circular cross section, showing its retention slots, for its coupling in a "+" fashion, constituting a sixth preferred embodiment of the system according to the present invention.
Figure 6A:
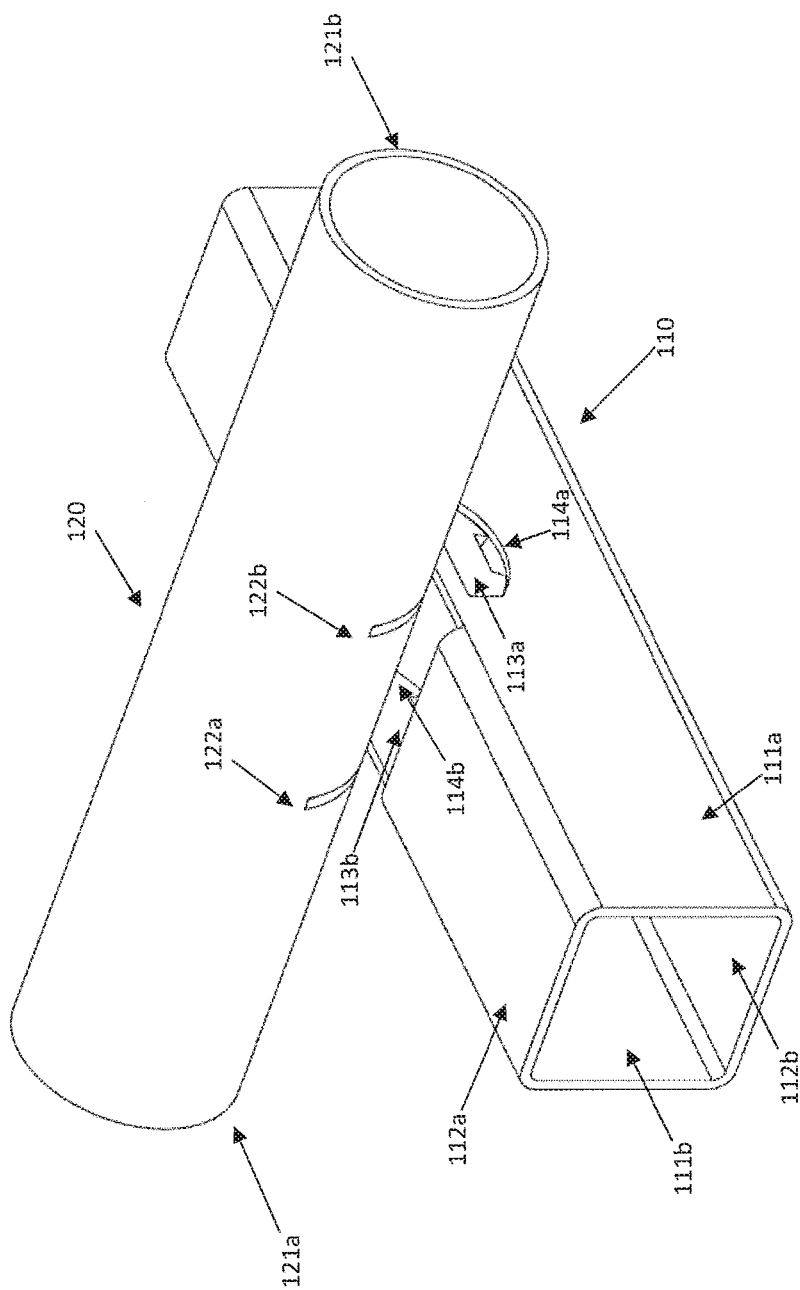
FIG. 6A, is a schematic conventional perspective view of the snap coupling system, between coupling members, of the present invention, showing a tubular male coupling member, of a quadrangular cross section, similar to that of FIG. 6, showing retention tabs lifted in an angle directed inwardly.
Figure 6B:
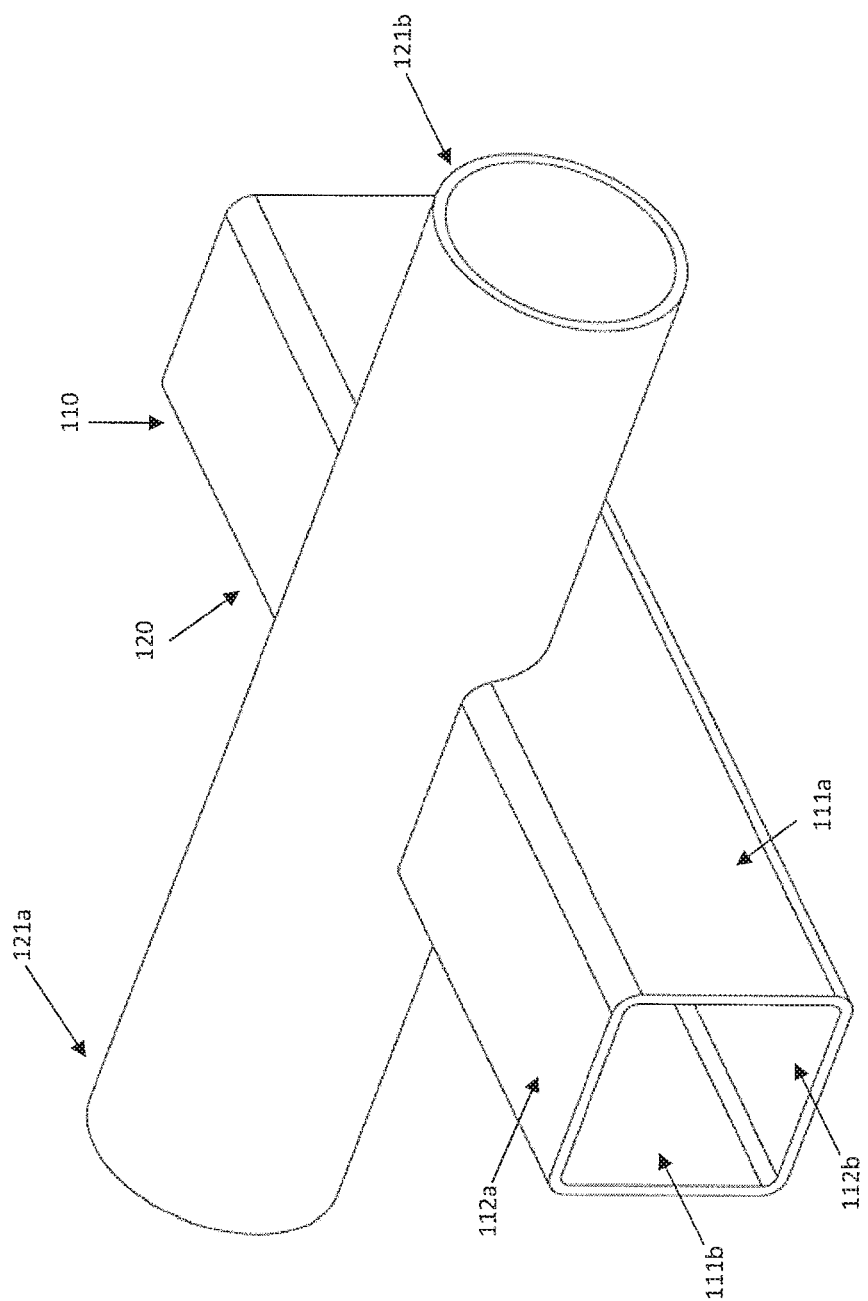
FIG. 6B, is a schematic conventional perspective view of the snap coupling system, between coupling members, of the present invention, of FIG. 6, fully assembled in a "+" fashion.

In a sixth embodiment of the invention, illustrated in FIG. 6, the snap coupling system between a tubular male coupling member of a quadrangular cross section, to be assembled in a "+" fashion, with a tubular female coupling member of a circular cross section, of the present invention, this having:

a tubular male coupling member 110, of a quadrangular cross section, having a first side wall 111*a* and a second side wall 111*b*; an upper wall 112*a* and a lower wall 112*b*; a first retention tab 113*a* and a second retention tab 113*b*, parallel to each other, both practiced in a transversal way in an intermediate portion of the side walls 111*a* and 111*b* extending from the edge of the upper wall 112*a* to the lower wall 112*b* presenting a retention edge 114*a* and 114*b* respectively, and a rectangular cut 115 in the upper wall 112*a*, placed upwardly of the tabs 113*a* and 113*b*, to allow the input of the tubular female coupling member 120 into the tubular male coupling member 110 through said rectangular cut 115;

tubular female coupling member 120 to be coupled to the tubular male coupling member 110 in a "+" fashion, of a circular cross section, having: an inner surface and an outer surface; a first end 121*a* and a second end 121*b*; a first and a second parallel transversal slots 122*a*, 122*b*, aligned at the same height to each other, at an intermediate portion of the tubular female coupling member 120, each of which extends vertically widthwise of the tubular female coupling member 120, such as it is illustrated in FIG. 6, wherein the distance between the first and second slots 122*a* and 122*b* is similar to the distance existing between the first and second tabs 113*a* and 113*b*, of the tubular male coupling member 110, such as is illustrated in FIG. 6;

the retention edges 114*a* and 114*b* of the retention tabs 113*a* and 113*b* preferably having its edge curved with the same curvature as the inner of the tubular female coupling member 120;

wherein the first and second tabs 113*a* and 113*b* of the side walls 111*a* and 111*b* of the tubular male coupling member 110, passing in a guided way through the first and second parallel transversal slots 122*a*, 122*b* of the tubular female coupling member 120, in a "+" fashion in such a way that the retention edge 114*a*, 114*b* of each of the first and second retention tabs 113*a* and 113*b*, are locked at the inner surface of the tubular female coupling member 120, being retained both coupling members to each other in a "+" fashion such as is illustrated in FIG. 6;

In the embodiment of FIG. 6A, the retention tabs 113*a* and 113*b* being flexed inwardly of the inner surface of the side walls 111*a* and 111*b* of the tubular male coupling member 110, conversely to the embodiment illustrated in FIG. 6.

Figure 7:
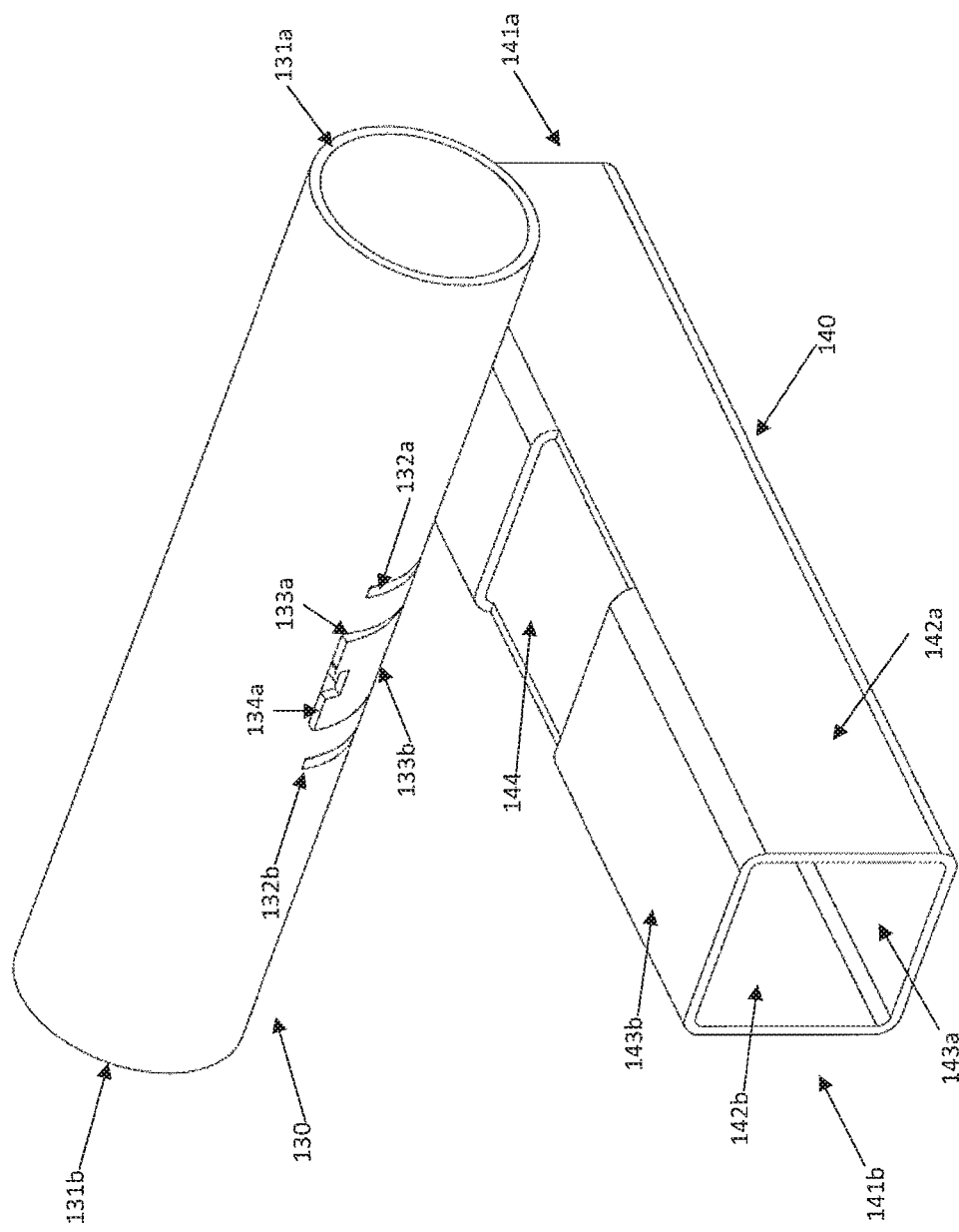
FIG. 7, is a schematic conventional perspective view of the snap coupling system, between coupling members, of the present invention, showing a tubular male coupling member of a circular cross section, showing its retention tabs lifted in an angle directed outwardly, and a tubular female coupling member, of a quadrangular cross section, showing its quadrangular retention cut for its coupling in a "+" fashion, constituting a seventh preferred embodiment of the system according to the present invention.
Figure 7A:
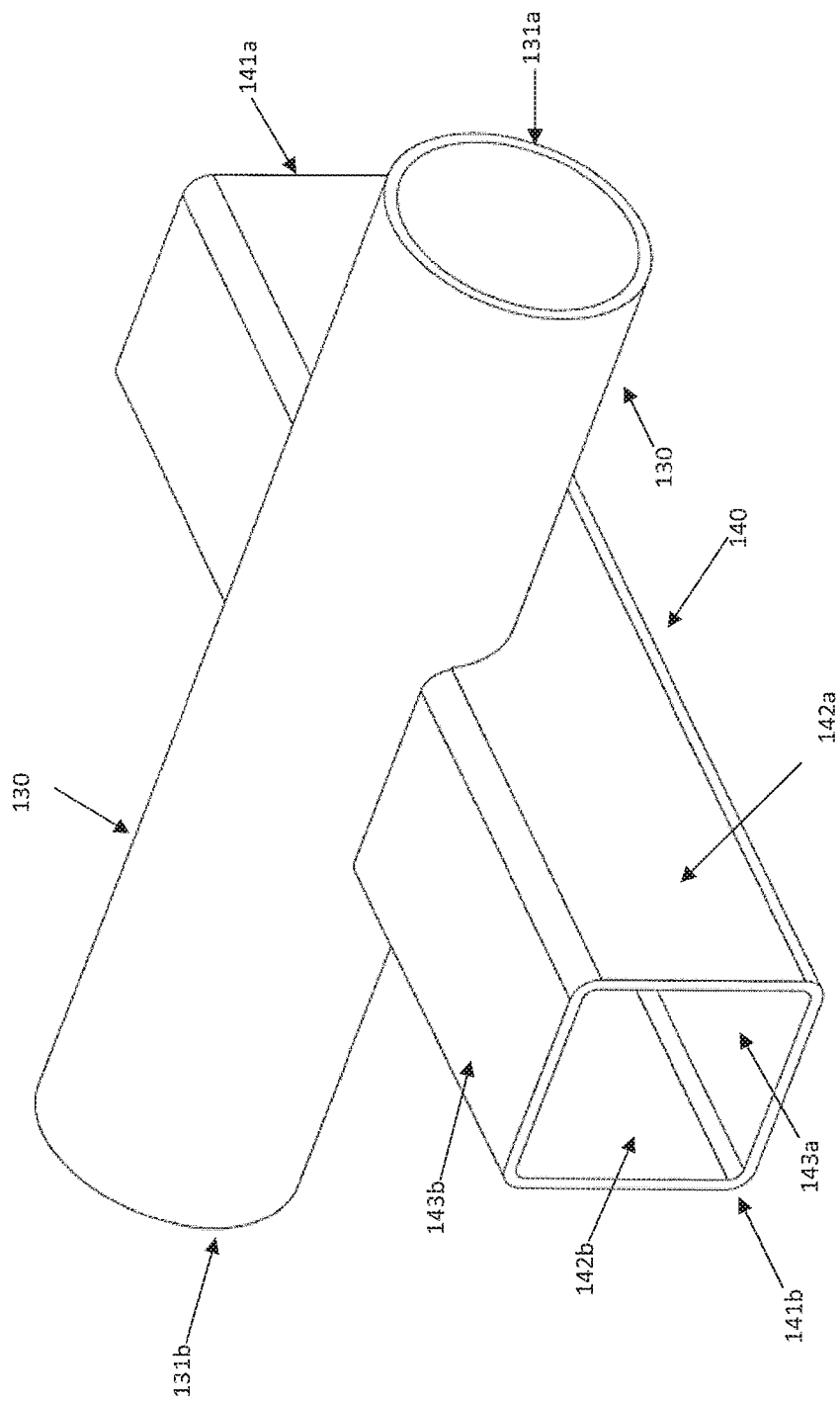
FIG. 7A, is a schematic conventional perspective view of the snap coupling system, between coupling members, of the present invention, of FIG. 7, fully assembled in a "+" fashion.

In a seventh embodiment of the invention, illustrated in FIG. 7, the snap coupling system between a tubular male coupling member, of a circular cross section, to be assembled in a "+" fashion with a tubular female coupling member, of a quadrangular cross section, of the present invention, this comprises:

a tubular male coupling member 130 of a circular cross section, having: a first end 131*a* and a second end 131*b*; a first slot 132*a* and a second slot 132*b* parallel to each other extending transversally at an intermediate portion of the tubular male coupling member 130, to approximately one third of the bosy of tubular male coupling member 130; a first and second retention tabs 133*a* and 133*b* (not illustrated) directed opposite to each other between the slots 132*a*, 132*b* at the curved surface of the tubular male coupling member 130 and lifted in an angle outwardly of said tubular male coupling member 130, presenting a retention edge 134*a* and 134*b* (not illustrated);

a tubular female coupling member 140, to be coupled to the tubular male coupling member 130 in a "+" fashion, of a quadrangular cross section, having: an inner surface and an outer surface; a first end 141*a* and a second end 141*b*; a first side wall 142*a* and a second side wall 142*b*; and a upper wall 143*a* and a lower wall 143*b*; and a quadrangular cut 144 in its lower wall 143*b* in an intermediate portion of the tubular female coupling member 140, having the same width as the slots 132*a* and 132*b* of the tubular male coupling member 130;

wherein the first and second slots 132*a* and 132*b*, with its respective tabs 133*a* and 133*b* (not illustrated) of the tubular male coupling member 130, passing in a guided way through the edges of the side walls 142*a* and 142*b* of the quadrangular cut 144 of the tubular female coupling member 140 coupling in a "+" fashion in such a way that the retention edge 134*a*, 134*b* (not illustrated), of each of the first and second retention tabs 133*a* and 133*b* (not illustrated), are locked on the inner surface of the tubular female coupling member 140, being retained both coupling members to each other in a "+" fashion, such as is illustrated in FIG. 7A.

Figure 8:
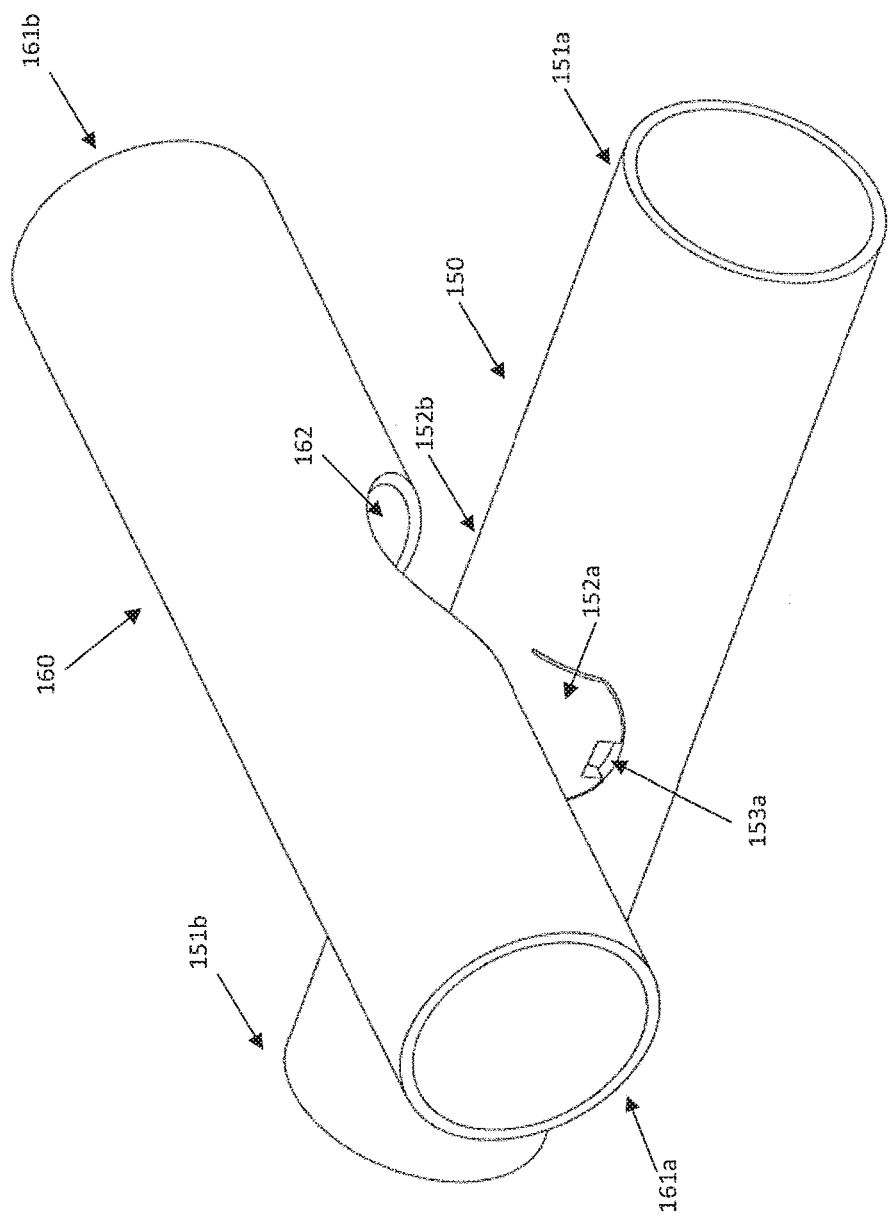
FIG. 8, is a schematic conventional perspective view of the snap coupling system, between coupling members, of the present invention, showing a tubular male coupling member of a circular cross section showing retention tabs lifted in an angle directed outwardly, and a tubular female coupling member of a circular cross section, showing its quadrangular cut, for its coupling in a "+" fashion, which constitutes an eight preferred embodiment of the system according with the present invention.
Figure 8A:
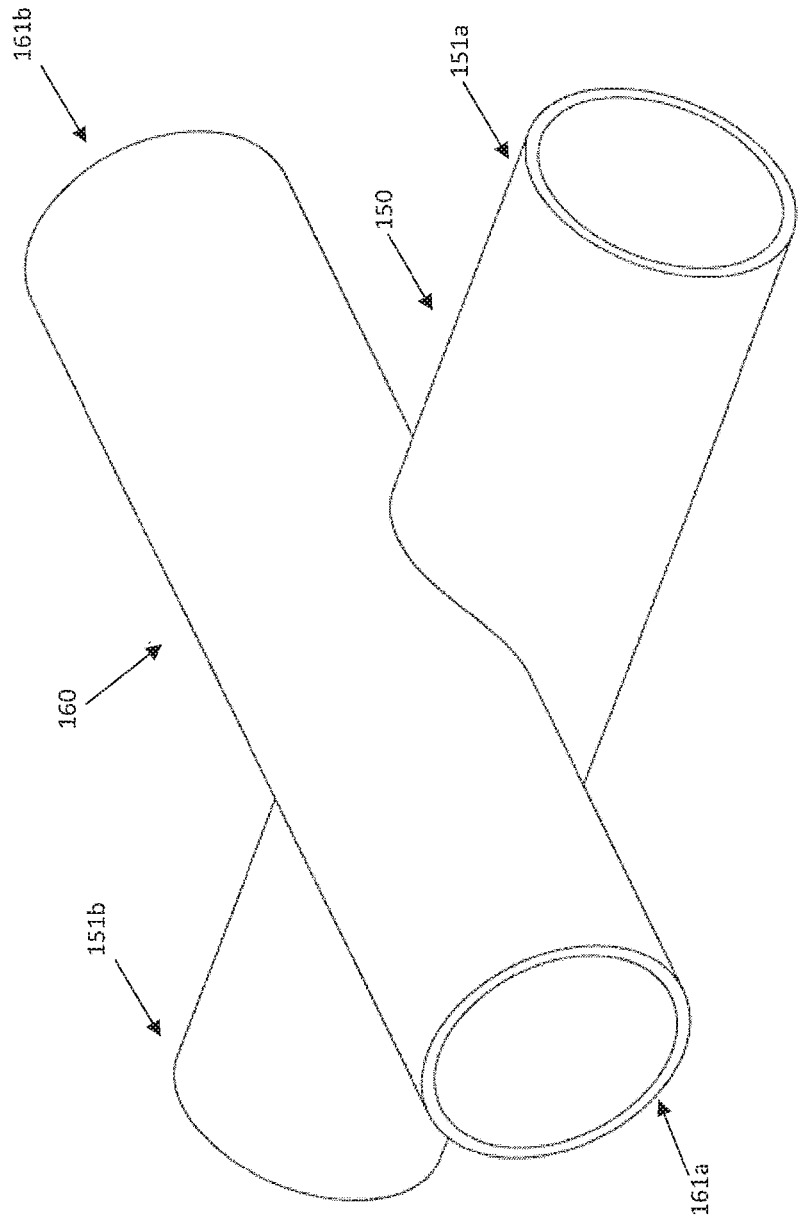
FIG. 8A, is a schematic conventional perspective view of the snap coupling system, between coupling members, of the present invention, of FIG. 8, fully assembled in a "+" fashion.

In an eighth embodiment of the invention, illustrated in FIG. 8, the snap coupling system between a tubular male coupling member, of a circular cross section, to be assembled in a "+" fashion with a tubular female coupling member, of a circular cross section, of the present invention, this comprises:

tubular male coupling member 150, of a circular cross section, having: a first end 151*a* and a second end 151*b*; a first tab 152*a* and a second tab 152*b* (not illustrated), opposed to each other at the curved surface of the tubular male coupling member 150, extending transversally at an intermediate portion of the tubular male coupling member 150, to about one third of the body of the tubular male coupling member 150 and lifted in an angle outwardly of said tubular male coupling member 150, each of which presenting a retention edge 153*a* and 153*b* (not illustrated);

a tubular female coupling member 160, of a circular cross section, to be coupled to the tubular male coupling member 150 in a "+" fashion, of a circular cross section, having: a first end 161a and a second end 161b; and a circular cut 162 at an intermediate portion of the tubular female coupling member 160, having the same width than the tabs 152a and 152b (not illustrated) of the tubular male coupling member 150;

wherein the first and second tabs 152a and 152b (not illustrated), with its respective retention edges 153a and 153b (not illustrated) of the tubular male coupling member 150 passing in a guided way through the lateral edges of the circular cut 162 of the tubular female coupling member 160 being coupled in a "+" fashion in such a way that the retention edge 153a, 153b (not illustrated), of each of the first and second retention tabs 152a and 152b (not illustrated), be locked at the inner surface of the circular cut 162 of the tubular female coupling member 160, being retained both coupling members to each other, in a "+" fashion as can be observed at FIG. 8A.

Figure 9:
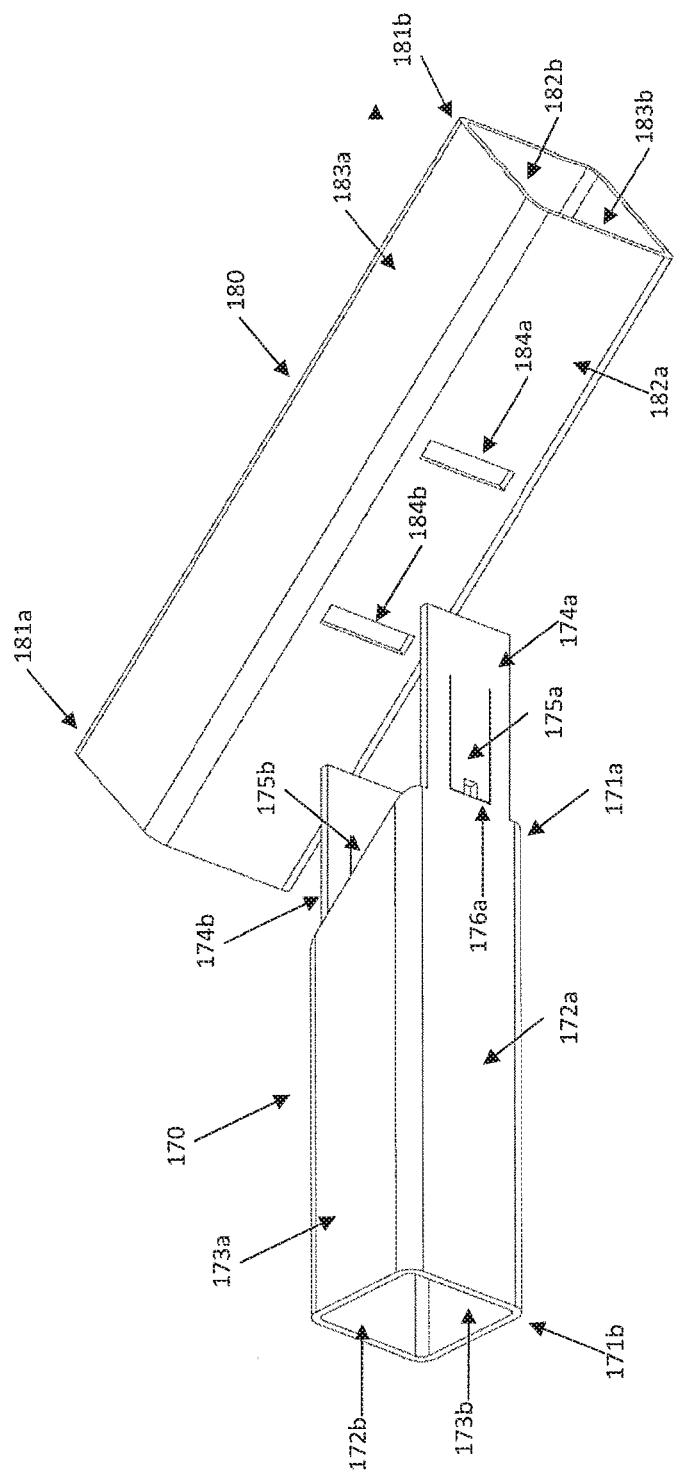
FIG. 9, is a schematic conventional perspective view of the snap coupling system, between coupling members, of the present invention, showing a tubular male coupling member of a quadrangular cross section, showing retention tabs angularly cut and lifted in an angle directed outwardly, and a tubular female coupling member, of a quadrangular cross section, showing its retention slots to be assembled to each other in an angular fashion constituting a ninth preferred embodiment of the system according with the present invention.
Figure 9A:
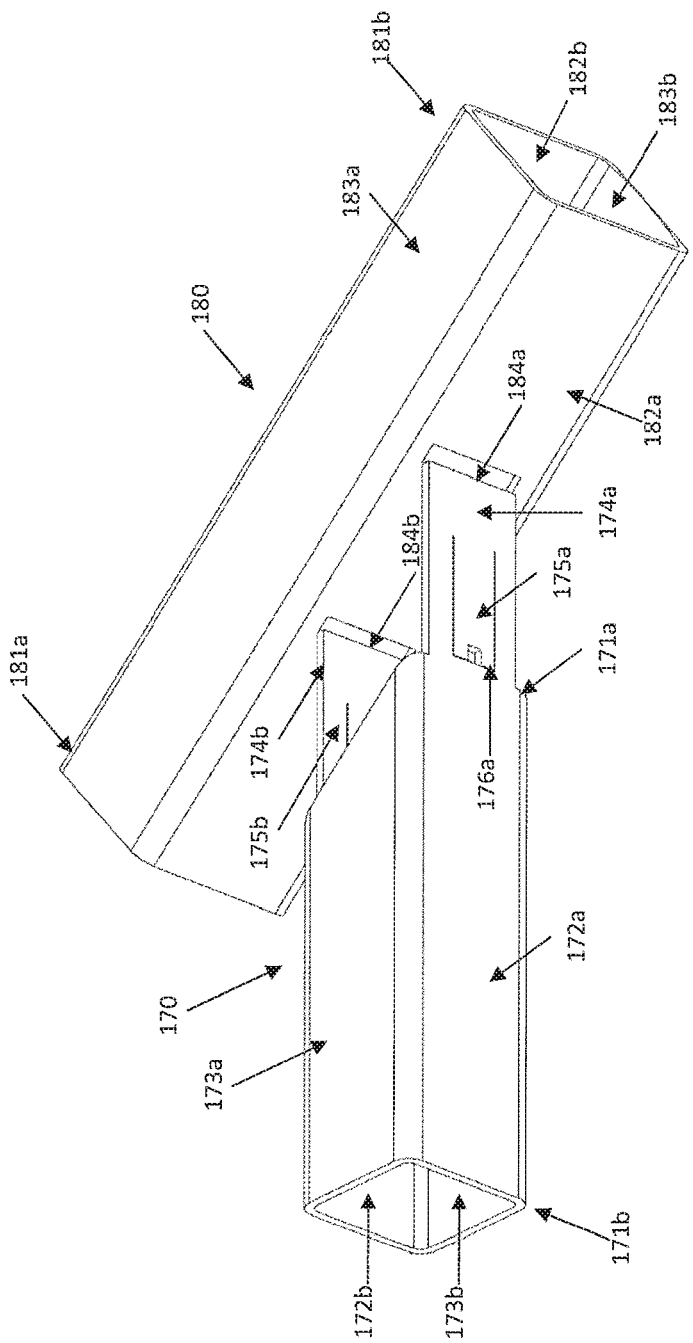
FIG. 9A, is a schematic conventional perspective view of the snap coupling system, between coupling members, of the present invention, of FIG. 9, showing retention tabs angularly cut and in an angle directed inwardly.
Figure 9B:
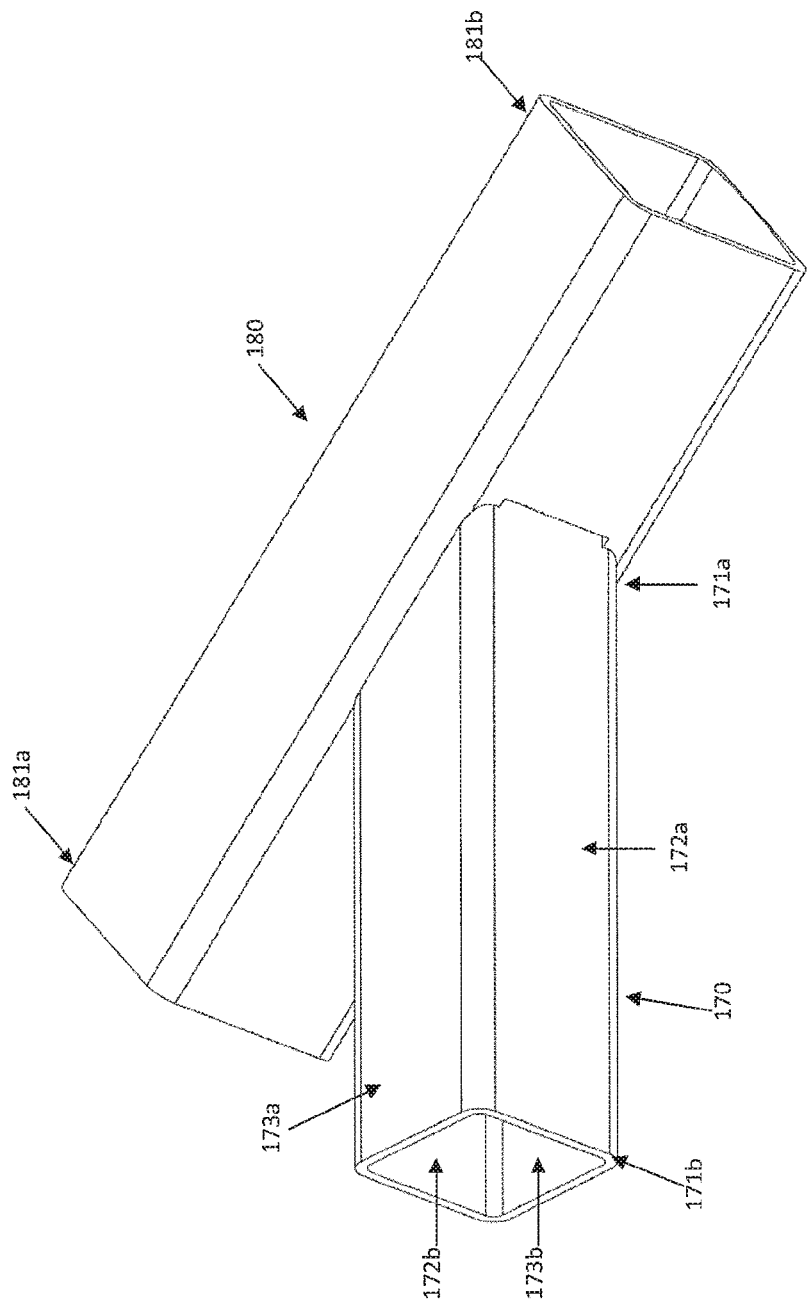
FIG. 9B is a schematic conventional perspective view of the snap coupling system, between coupling members, of FIG. 9, fully assembled in an angular fashion.

A ninth embodiment of the snap coupling system between tubular coupling members, of a quadrangular cross section to be angularly coupled, in an any suitable angle, of the present invention, illustrated in FIGS. 9, 9A and 9B, this comprises:

a tubular male coupling member 170 of a quadrangular cross section, having a first end 171a and a second end 171b, the first end 171a being cut in an angle to the second end 171b; a first side wall 172a and a second side wall 172b shorter than the first side wall 172a; an upper wall 173a and a lower wall 173b, which are cut at the same angle than the first end 171a; a first projection 174a extending from the first end 171a of the first side wall 172a of the tubular male coupling member 170, said projection 174a including a retention tab 175a, cut therein directed to the second end 171b of said tubular male coupling member 170 and lifted in an angle outwardly of said tubular male coupling member 170, presenting a retention edge 176a; and a second projection 174b which is shorter than the first projection 174a, extending from the first end 171a of the second side wall 172b of the tubular male coupling member 170, said projection 174b including a retention tab 175b cut therein, directed also to the second end 171b of the tubular male coupling member 170, and lifted in an angle outwardly of said tubular male coupling member 170 presenting a retention edge 176b (not illustrated);

a tubular female coupling member 180, of a quadrangular cross section, to be angularly coupled to the tubular male coupling member 170, having: an inner wall and an outer wall; a first end 181a and a second end 181b; a first side wall 182a and a second end wall 182b; and an upper wall 183a and a lower wall 183b; a first and a second parallel transversal slots 184a, 184b, each of which extending vertically widthwise of the first side wall 182a of the tubular female coupling member 180, such as illustrated in FIG. 9, wherein the distance between the first and second slots 184a and 184b is similar to the distance existing between the first and second projections 174a and 174b of the tubular male coupling member 170, such as it is illustrated in FIG. 9;

wherein the first and second projections 174a and 174b being angularly defaced to each other, with their respective retention tabs 175a, 175b of the side walls 172a and 172b of the tubular male coupling member 170, passing in a guided way through the first and second parallel transversal slots 184a, 184b of the first side wall 182a of the tubular female coupling member 180 in an angular way, such that the retention edge 176a, 176b (not illustrated) of each of the first and second retention tabs 175a and 195b of the projections 174a, 174b are locked at the inner surface of the first side wall 182a of the tubular female coupling member 180, being angularly retained both coupling members to each other, in accordance to the angle cut of the first end 171a of the tubular male coupling member 170, such as it can be observed from FIG. 9B.

In the embodiment illustrated in FIG. 9A, the retention tabs 175a and 175b being flexed inwardly of the inner surface of the side walls 172a and 172b of the tubular male coupling member 170, conversely to the embodiment illustrated in FIG. 9A.

Additionally, the tubular female coupling member 180, can include a pair of slots (not illustrated) in its side walls 182b to angularly coupling an additional tubular male coupling member, similar and opposite to the 170.

Figure 10:
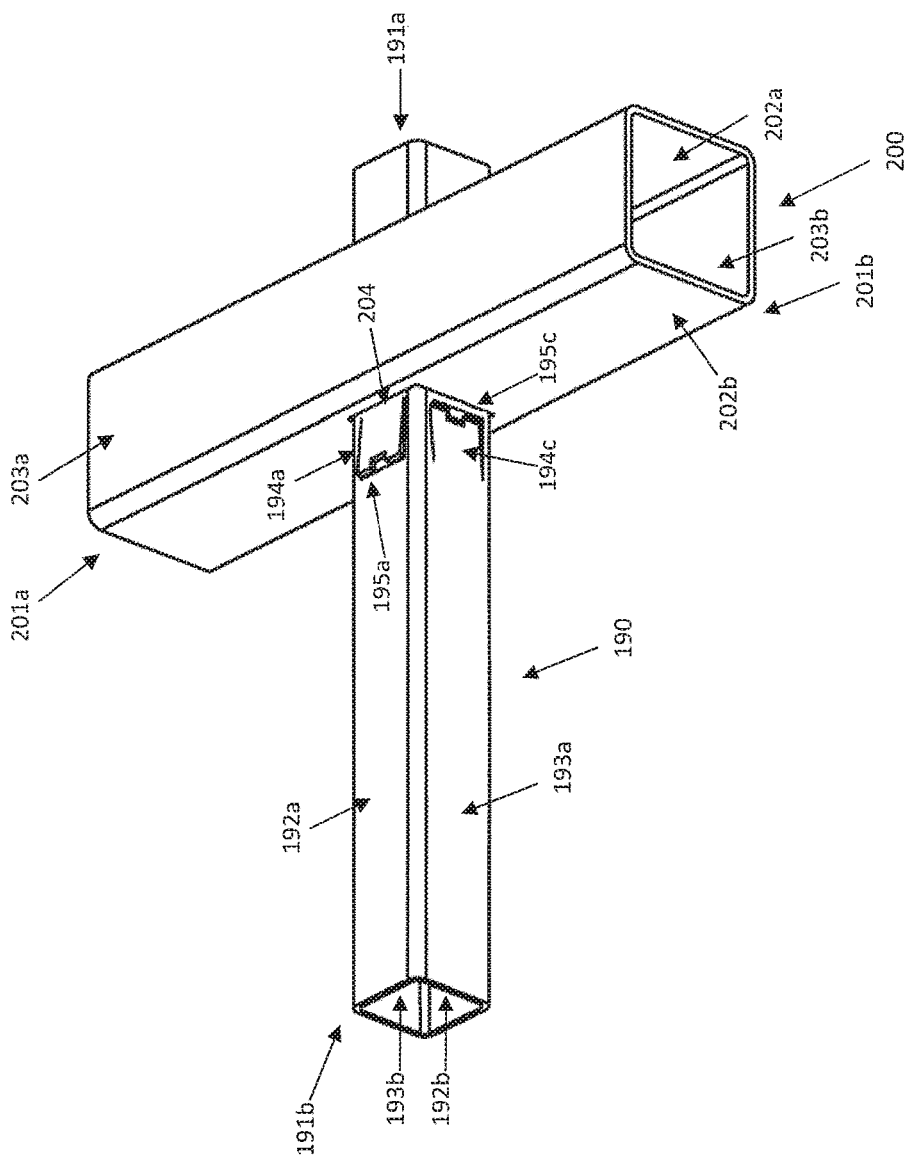
FIG. 10, is a schematic conventional perspective view of a tenth embodiment of the snap coupling system, between coupling members, showing a tubular male coupling member of a quadrangular cross section, showing two retention tabs in its lateral walls, and two retention tabs in its upper and lower walls, opposed to the lateral walls, lifted in an angle directed outwardly, and a tubular female coupling member of a quadrangular cross section, showing a passing through retention aperture, for assembling to each other in a "+" fashion.

In a tenth embodiment of the snap coupling system between coupling members, illustrated in FIG. 10, comprising tubular male coupling member, of a quadrangular cross section, having two retention tabs opposite to each other, lifted in an angle outwardly, and a tubular female coupling member of a quadrangular cross section, having a passing through retention aperture, to be assembled to each other in a "+" fashion, comprising:

a tubular male coupling member 190 of a quadrangular cross section, having: a first end 191a and a second end 191b; a first side wall 192a and a second side wall 192b; an upper wall 193a and a lower wall 193b; a first and a second retention tabs 194a, 194b (not illustrated) cut in the side walls 192a and 192b, at an intermediate portion of the tubular male coupling member 190, directed to the second end 191b of said tubular male coupling member 190, and lifted in an angle outwardly of said tubular male coupling member 190, presenting a retention edge 195a, 195b (not illustrated); and a third and a fourth retention tabs 194c and 194d (not illustrated) at an intermediate portion of the tubular male coupling member 190, at the same height than the tabs a 194a and 194b, but directed to the first end 191a of said tubular male coupling member 190 and lifted in an angle outwardly of said tubular male coupling member 190, presenting a retention edge 195c, 195d (not illustrated), opposite to the first and second retention tabs 194a, 194b, cut at the upper and lower walls 193a and 193b of the tubular male coupling member 190; and a tubular female coupling member 200, of a quadrangular cross section, having a first end 201a and a second end 201b; an upper wall 202a and a lower wall 202b; a first and a second side walls 203a and 203b; and a passing through retention aperture 204, of a quadrangular cross section, at each of the upper and lower walls 202a and 202b, at an intermediate portion of the tubular female coupling member 200, through which aperture 204 passing the tubular male coupling member 190 by passing the tabs 194a 194b, 194c and 194d trough said aperture 204 to be locked at the interior thereof, assembling to each other in a "+" fashion.

Figure 10A:
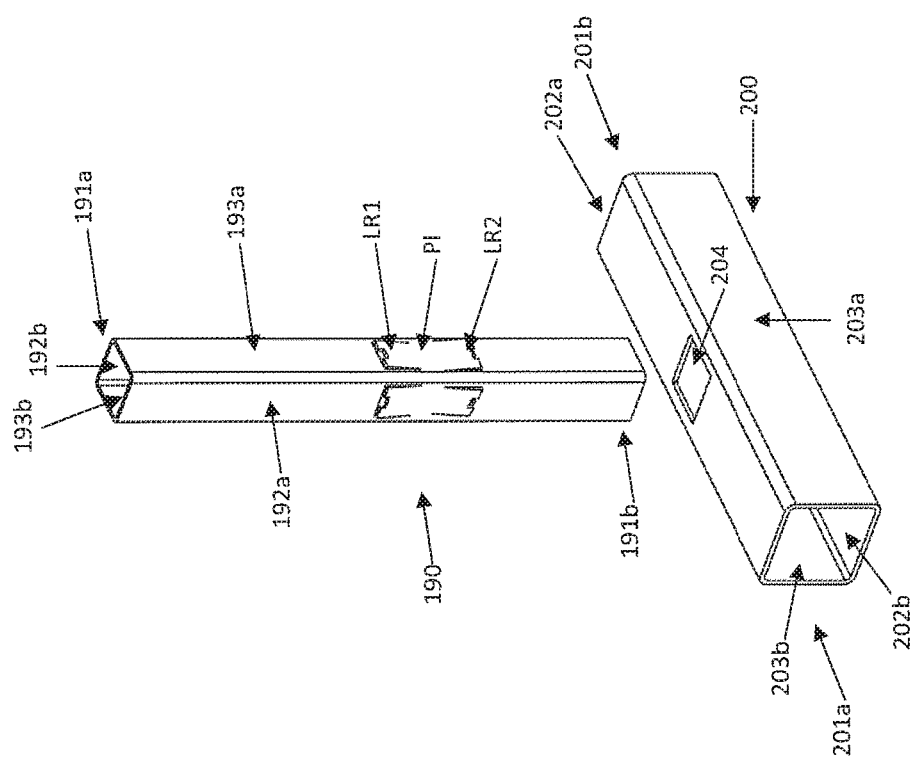
FIG. 10A, is a schematic conventional perspective view of the snap coupling system, between coupling members, showing a tubular male coupling member of a quadrangular cross section, showing in turn two retention tabs opposed to each other, in each one of its walls, lifted in an angle directed outwardly, and a tubular female coupling member of a quadrangular cross section, showing a passing trough retention aperture, to be assembled to each other in a "+" fashion.
Figure 10B:
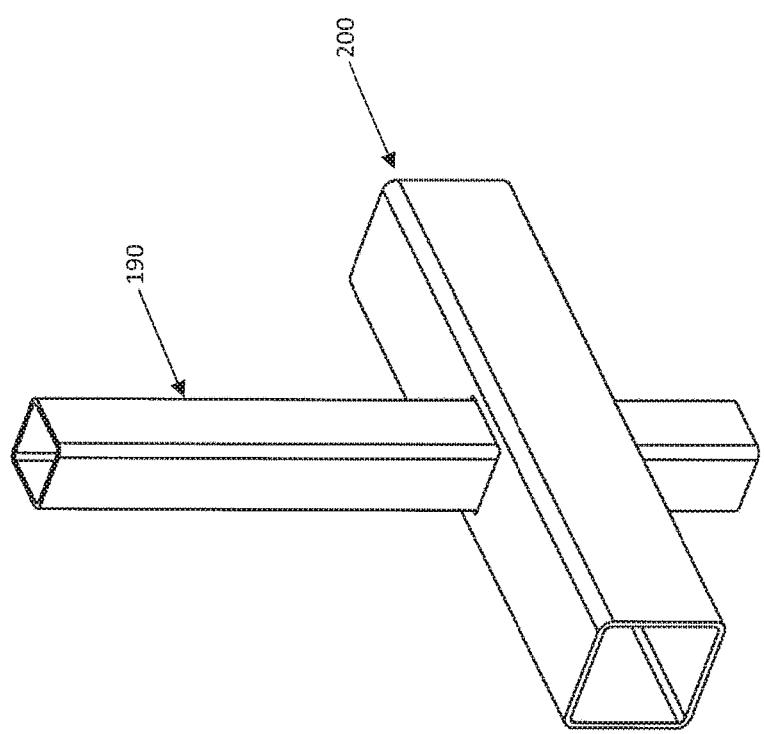
FIG. 10B, is a schematic conventional perspective view of the snap coupling system, between coupling members, of FIG. 10, showing a tubular male coupling member of a quadrangular cross section y un tubular female coupling member of a quadrangular cross section, fully assembled to each other, in a "+" fashion.

In a variation of this tenth embodiment, illustrated in FIG. 10A, each retention tab of the tubular male coupling member 190, comprising a first retention tab LR1 starting from an intermediate PI of one of its walls 192a, 192b, 193a, 193b, directed to the first end 191a of the tubular male coupling member 190, and a second retention tab LR2 starting of the same intermediate portion PI of the same wall as the retention tab LR1, but directed to the end 191b of the tubular male coupling member 190; both retention tabs LR1 and LR2 being distributed at an space similar to the cross section of the tubular female coupling member 200, such that on passing the tubular male coupling member between the passing through the quadrangular retention aperture 204 of the tubular female coupling member 200, each tab LR1 and LR2 being bilaterally locked both to the first end 191a, as to the second end 191b of the tubular male coupling member 190.

Also in this embodiment, it is possible to include a single tab in one sense and the other in an opposite sense, depending of the strength and stability which it is desired for the coupling system.

Figure 11:
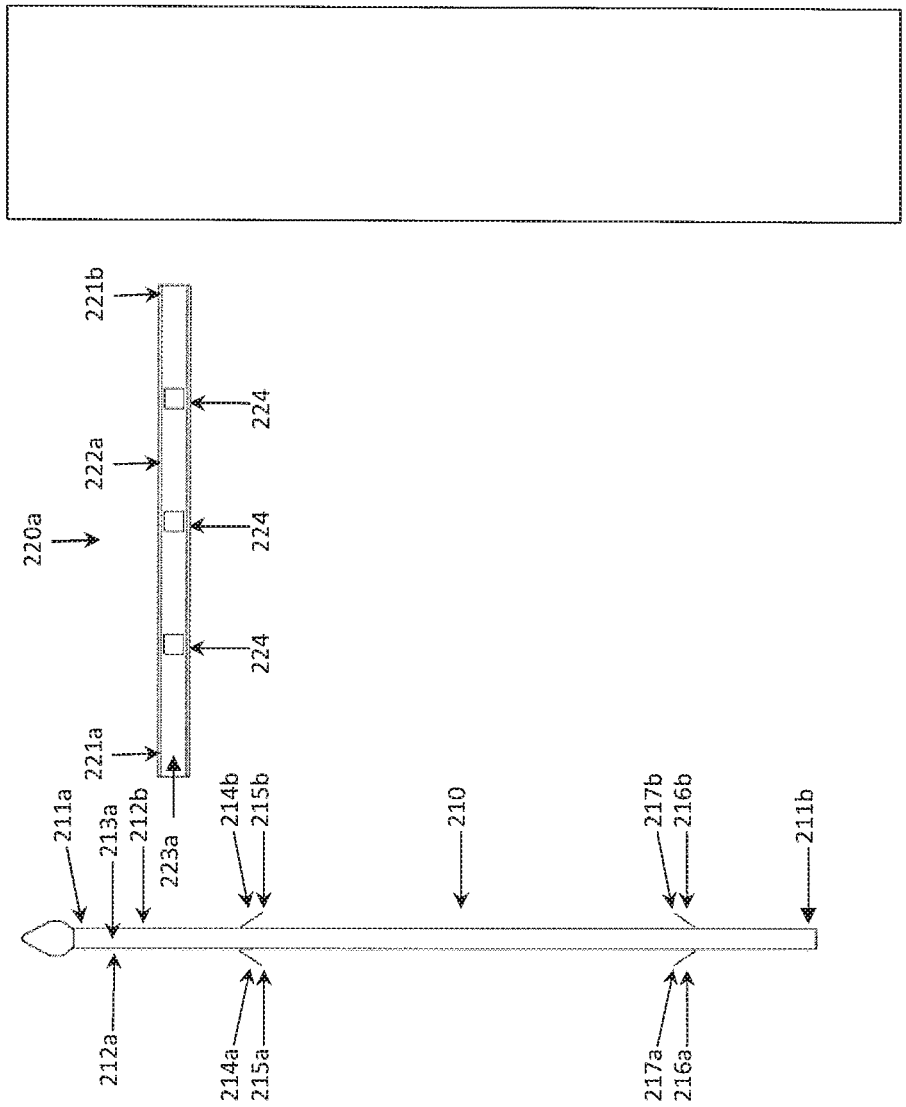
FIG. 11, is a schematic front view, of an eleventh embodiment of the snap coupling system, between coupling members, showing a tubular male coupling member of a quadrangular cross section, showing in turn its retention tabs lifted in an angle directed outwardly, and a tubular female coupling member, of a quadrangular cross section, showing its passing through retention aperture, to be assembled to each other, in a "+" fashion, forming a fence or gate.
Figure 11A:
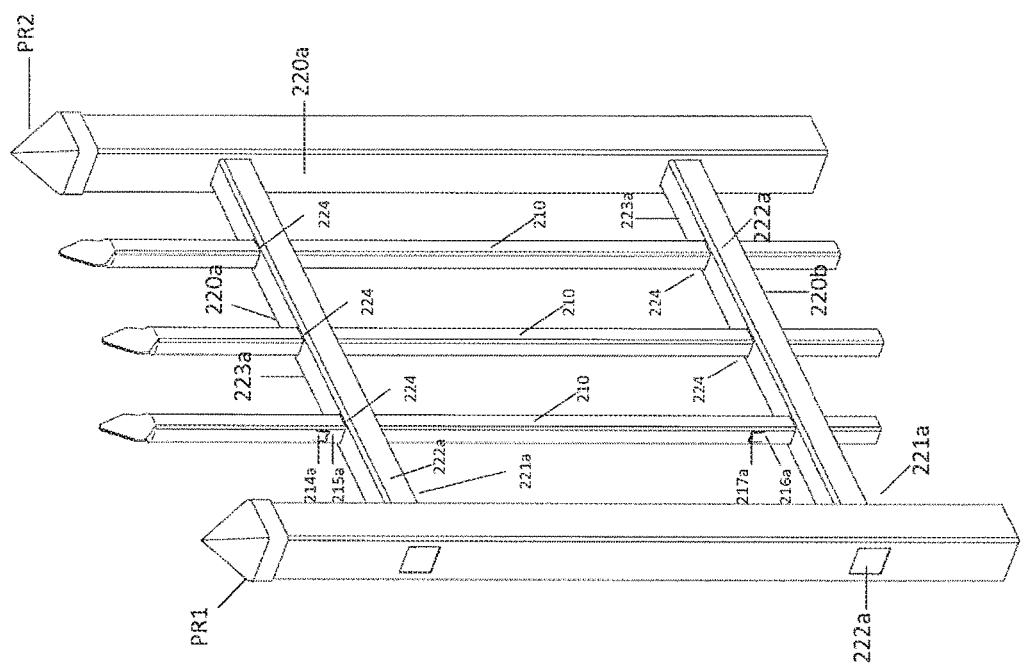
FIG. 11A, is a schematic conventional perspective view of the snap coupling system, between coupling members, of FIG. 11, forming a fence or grid, partially assembled.
Figure 11B:
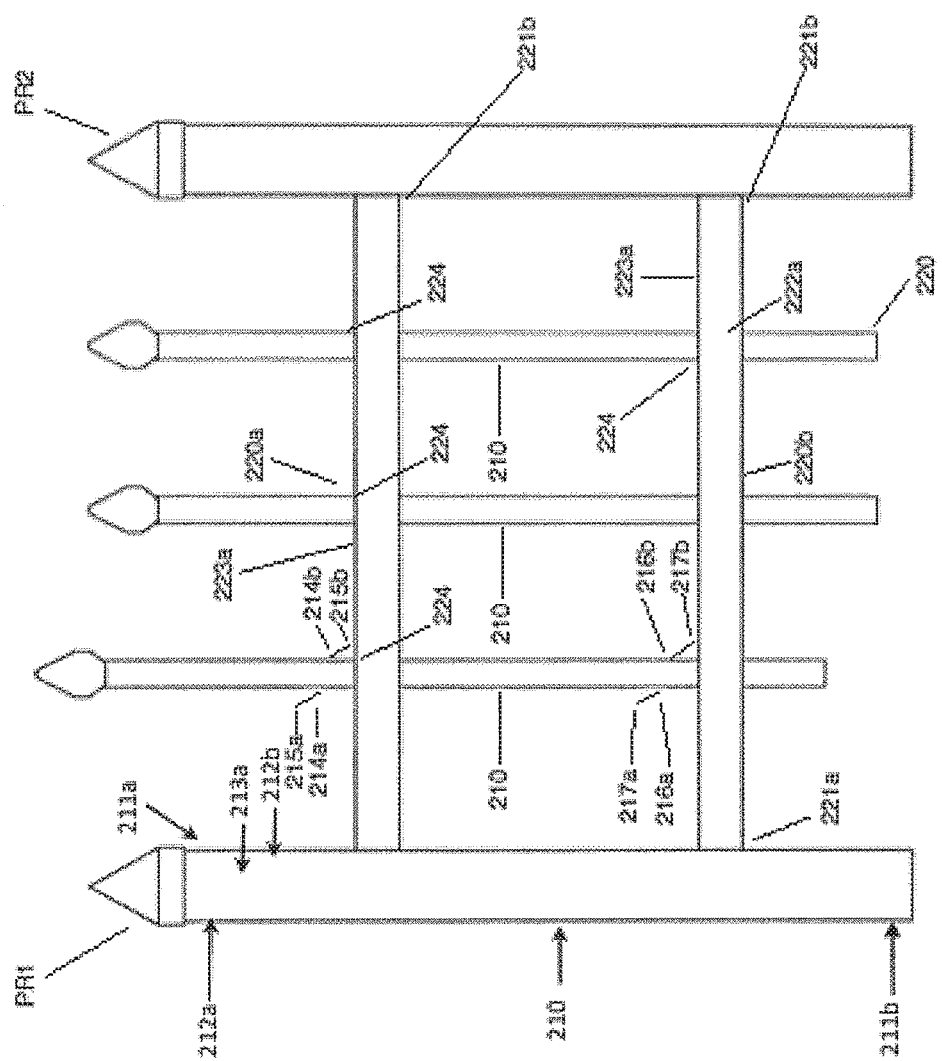
FIG. 11B, is a frontal view, similar to that of FIG. 11A, showing a variant of the arrangement of the tabs of the male coupling member forming a fence or gate partially assembled.

In an eleventh embodiment of the snap coupling system for using with a plurality of tubular coupling members, of quadrangular cross section, to be assembled in a fence or gate, of the present invention, illustrated in FIGS. 11, 11A and 11B, comprising:

at least a tubular male coupling member 210, of a quadrangular cross section, having: a first end 211a and a second end 211b; a first side wall 212a and a second side wall 212b; a front wall 213a and a rear wall 213b (not illustrated); a first and a second retention tabs 214a, 214b cut in the side walls 212a and 212b directed to the second end 211b of said tubular male coupling member 210 and lifted in an angle outwardly of said tubular male coupling member 210, presenting a retention edge 215a, 215b; and a third and four retention tabs 216a and 216b opposite to the first and second retention tabs 214a, 214b, spaced to each other at a selected distance, cut at the same side walls 212a and 121b, directed to the first end 211a of said tubular male coupling member 210, lifted in an angle outwardly of said tubular male coupling member 210, presenting a retention edge 217a and 217b, respectively, directed to the first end 212a of the tubular male coupling member 210 and lifted at an angle outwardly of said tubular male coupling member 210;

at least two tubular female coupling member 220a, 220b of a quadrangular cross section, which are retained by retention posts PR1, PR2 (FIG. 11A) to which at least a tubular male coupling member 210 is coupled, to be maintained coupled avoiding that these tubular female coupling members could became detached, forming a fence or gate, each of the tubular female coupling members 220a and 220b has: a first end 221a and a second end 221b; a first and second lateral walls 222a and 222b (not illustrated); and an upper wall 223a and a lower wall 223b; at least two transversal apertures 224 extending horizontally crossing the upper and lower walls 223a and 223b of each tubular female coupling member 220a, 220b, spaced at a selected distance similar to that of the retention tabs 214a, 214b, 216a and 216b of the tubular male coupling member 210, such as it is illustrated in FIGS. 11 and 11A;

wherein the first and second retention tabs 214a, 214b of the side walls 212a and 212b of the tubular male coupling member 210, passing in a guided way through the first and second transversal apertures 224 of the upper and lower walls 223a and 223b (not illustrated) of the tubular female coupling member 220a and 220b, in such a way that the retention edge 215a, 215b of each of the first and second retention tabs 214a and 214b, of the side walls 212a and 212b of the tubular male coupling member 210, be locked on the upper surface of the upper wall 223a of the tubular female coupling member 220, in such a way that prevents that the tubular male coupling member 210 be detached or retires by its lower end 211b; and the third and fourth retention tabs 216a and 216b of the side walls 212a and 121b of the tubular male coupling member 210, passing in a guided way through the aperture 224 of the upper and lower walls 223a and 223b of the tubular female coupling member 220, in such a way that the retention edge 217a, 217b of each of the third and fourth retention tabs 216a and 216b, of the side walls 212a and 212b of the tubular male coupling member 210 be locked on the lower surface of the lower wall 223b (not illustrated) of the tubular female coupling member 220b, in such a way that prevents that the tubular male coupling member 210 be detached by its upper end 211a, such as it is observed from FIGS. 11 and 11A.

In another embodiment of the tubular male coupling members 210, as it is illustrated in FIG. 11B, each of the tubular male coupling member 210, has a retention tab 214a, 216b with its retention edge 215a, 217b, directed to the first end 211a, in its first side wall 212a and a retention wall 214a, 216b, with its retention edge 215a, 217b, in its second side wall 212b, but directed to the second end 211b, in such a way that each of the tubular male coupling members being retained in both senses by its respective intermediate parts.

It should be understand that in all embodiments formerly described, when coupling the tubular male coupling member with the tubular female coupling member, the retention tabs of the tubular male coupling member are momentarily flexed to allow the tabs passing through the slots of the tubular female coupling member and then, on completely entering the tubular male coupling member into the tubular female coupling member, the tabs recover its position so that its retention edge be locked at the interior of the tubular female coupling member.

It should be additionally understand that the fence or gate assembled in accordance to the formerly described, can comprise a plurality of tubular male coupling members and tubular female coupling members, under the condition that include the tabs and slots corresponding to the number of coupling members.

Furthermore, in the embodiment of FIG. 10, the tubular female coupling members can be solid of quadrangular or rectangular cross section, as may be the cross section form of the tubular male coupling member.

Additionally, both tubular male and female coupling members can have a circular cross section.

Also, as should be evident from the analysis of the tubular female coupling members, of the present invention, all of them present at least a flat or curved surface, with its coupling slots at a unique surface, without the rest of the surrounding walls, which could be only a single flat or curved wall.

All of these embodiments could be visualized from the following Table 1 of embodiments

TABLE 1

| Cross Section of the tubular male coupling member | Cross Section of the tubular female coupling member | Coupling Type | FIGS. No. | Embodiment |
|---|---|---|---|---|
| Quadrangular | Quadrangular | "T" | 1, 1A, 1B, 1C, 1D | First |
| Quadrangular | Quadrangular | "+" | 2, 2A, 2B | Second |
| Quadrangular | Circular | "T" | 3, 3A, 3B | Third |
| Circular | Circular | "T" | 4, 4A, 4B | Fourth |
| Circular | Quadrangular | "T" | 5, 5A, 5B | Fifth |
| Quadrangular | Circular | "+" | 6, 6A, 6B | Sixth |
| Circular | Quadrangular | "+" | 7, 7A | Seventh |
| Circular | Circular | "+" | 8, 8A | Eight |
| Quadrangular | Quadrangular | Angular | 9, 9A, 9B | Ninth |
| Quadrangular | Quadrangular | "+" | 10, 10A, 10B | Tenth |
| Quadrangular | Quadrangular | Fence or Gate | 11, 11A | Eleventh |

The unions referred at the specific embodiments can support a high amount of weight, which give opportunity of apply them in diverse situations.

It should be finally understand that the snap coupling system between metallic or non-metallic tubular coupling members, of the present invention, is not limited to the embodiments formerly described and that the persons skilled in the art will be able, by the teachings herein disclosed, to carry out changes in the snap coupling system between tubular coupling members, of the present invention, which will be within the true scope of the invention, which will be set forth exclusively by the following claims.

The invention claimed is:

1. A snap coupling system between a tubular male coupling member and a tubular female coupling member, the tubular male coupling member and the tubular female coupling member each having a quadrangular shaped cross-section, comprising:
   the tubular male coupling member having:
   a first end, a second end, an inferior wall, a superior wall and opposed lateral walls;
   a quadrangular opening cut in a middle portion of the inferior wall;
   a first groove and a second groove parallel to each other cut in each lateral wall respectively along two opposite sides of the quadrangular opening, each of the first groove and the second groove extending from an edge of the inferior wall toward the superior wall; and
   a retention tab transversely cut in each lateral wall locating between the first groove and the second groove and extending from the superior wall toward the inferior wall, wherein each retention tab is outwardly lifted in an angle with respect to a surface of a lateral wall and has a retention edge;
   the tubular female coupling member having:
   a first end, a second end, an inferior wall, a superior wall and opposed lateral walls;
   a quadrangular opening cut in a middle portion of the superior wall; and
   a first groove and a second groove parallel to each other transversely cut in each lateral wall along two opposite sides of the quadrangular opening of the tubular female coupling member respectively, each of the first groove and the second groove extending from an edge of the superior wall toward the inferior wall;
   wherein the quadrangular opening of the tubular female coupling member corresponds to the quadrangular opening of the tubular male coupling member so that each lateral wall at the quadrangular opening of the tubular male coupling member enters the quadrangular opening of the tubular female coupling member; and
   wherein the first groove and the second groove of the tubular female coupling member corresponds to the first groove and the second groove of the tubular male coupling member respectively, allowing each retention tab of the tubular male coupling member to momentarily flex inwardly with respect to a surface of the surrounding wall of the male coupling member in order to tightly pass through the quadrangular opening of the tubular female coupling member such that when the retention tab recovers its position inside the cross-section of the tubular female coupling member, its retention edge is locked at an inner surface of the superior wall of the tubular female coupling member thus coupling the tubular male coupling member and the tubular female coupling member in a cross-shaped fashion.

2. The snap coupling system as claimed in claim 1 wherein the first groove and the second groove of the tubular male coupling member and/or the tubular female coupling member transversally extend at a middle portion thereof to about one third of its body width.

3. The snap coupling system as claimed in claim 1 further comprising a pair of retention tabs transversely cut between the first groove and the second groove in opposite lateral walls of the tubular female coupling member respectively each retention tab extending from the inferior wall toward the superior wall of the female coupling member, and each retention tab being outwardly lifted in an angle with respect to a surface of a lateral wall and having a retention edge.

4. The snap coupling system as claimed in claim 1, wherein each retention tab has a slot at an end central portion thereof for inserting a tool through the same and facilitating the flexing of the retention tab until a desired position.

* * * * *